United States Patent
Kim et al.

(10) Patent No.: US 11,460,838 B2
(45) Date of Patent: Oct. 4, 2022

(54) APPARATUS AND METHOD FOR VIRTUAL HOME SERVICE

(71) Applicant: LG Electronics Inc., Seoul (KR)

(72) Inventors: Hyun Soo Kim, Seoul (KR); Kyung Jun Shin, Seoul (KR); Dong Heon Shin, Seoul (KR); Sun Yup Kim, Seoul (KR); Hyun Sang Park, Seoul (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 16/557,991

(22) Filed: Aug. 30, 2019

(65) Prior Publication Data

US 2020/0004237 A1 Jan. 2, 2020

(30) Foreign Application Priority Data

Aug. 6, 2019 (KR) .................. 10-2019-0095631

(51) Int. Cl.
  *G05D 1/00* (2006.01)
  *G05D 1/02* (2020.01)
  (Continued)

(52) U.S. Cl.
  CPC ......... *G05D 1/0022* (2013.01); *G05D 1/0227* (2013.01); *G05D 1/0234* (2013.01);
  (Continued)

(58) Field of Classification Search
  CPC .. G05D 1/0022; G05D 1/0227; G05D 1/0234; G05D 1/0274; G05D 2201/0215;
  (Continued)

(56) References Cited

U.S. PATENT DOCUMENTS

| 10,025,887 B1* | 7/2018 | Santarone | G01S 5/14 |
| 2015/0370272 A1* | 12/2015 | Reddy | G06F 9/546 |
| | | | 700/278 |

(Continued)

FOREIGN PATENT DOCUMENTS

KR 2018-0004030 A 1/2018

*Primary Examiner* — Adam R Mott
*Assistant Examiner* — Elizabeth Rose Neleski
(74) *Attorney, Agent, or Firm* — Fish & Richardson P.C.

(57) ABSTRACT

An embodiment of the present disclosure is a virtual home service apparatus including, a communicator, a home information collector for obtaining a design drawing of the home, and obtaining a 3D drawing by converting the design drawing, a home appliance identifier for obtaining an internal image and SLAM information of the home, and identifying the location and state of the home appliance based on the internal image and the SLAM information, and a virtual home implementator for generating virtual home information by reflecting the location and state of the home appliance to the 3D drawing.

One or more among an autonomous driving vehicle, a user terminal, and a server according to an embodiment of the present disclosure may be associated with or converged with an Artificial Intelligence module, an Unmanned Aerial Vehicle (UAV), a robot, an Augmented Reality (AR) apparatus, a Virtual Reality (VR), 5G service-related apparatus, etc.

15 Claims, 9 Drawing Sheets

(51) Int. Cl.
  *G06T 15/20* (2011.01)
  *G06F 3/0488* (2022.01)
  *H04W 4/021* (2018.01)
  *G10L 15/22* (2006.01)

(52) U.S. Cl.
  CPC ......... *G05D 1/0274* (2013.01); *G06F 3/0488* (2013.01); *G06T 15/205* (2013.01); *G10L 15/22* (2013.01); *H04W 4/021* (2013.01); *G05D 2201/0215* (2013.01); *G10L 2015/223* (2013.01)

(58) Field of Classification Search
  CPC ..... G06F 3/0488; G06F 3/041; G06T 15/205; G06T 19/00; G10L 15/22; G10L 2015/223; H04W 4/021; H04L 12/2807; H04L 12/2812; H04L 12/2816; H04L 12/2834; G06Q 50/10
  See application file for complete search history.

(56) References Cited

U.S. PATENT DOCUMENTS

2018/0096684 A1* 4/2018 Goote .................... G10L 15/22
2020/0218274 A1* 7/2020 Lee ..................... G05D 1/0251

* cited by examiner

APPARATUS AND METHOD FOR VIRTUAL HOME SERVICE

CROSS-REFERENCE TO RELATED APPLICATION

This present application claims benefit of priority to Korean Patent Application No. 10-2019-0095631, filed on Aug. 6, 2019 in the Korean Intellectual Property Office, the entire disclosure of which is incorporated by reference.

BACKGROUND

1. Technical Field

The present disclosure relates to a virtual home service apparatus and method for providing an interface installed in an apparatus installed in a vehicle or a vehicle platform, particularly, an autonomous vehicle, to control a home appliance.

2. Description of Related Art

As the user requirement for a vehicle increases, development of a vehicle platform for performing various interfaces with a home appliance and a user terminal is being actively made.

In particular, since an autonomous vehicle does not require human operation in driving the vehicle, a passenger of the autonomous vehicle requires an interface capable of performing various functions during a driving time in the vehicle.

One of the related arts about the vehicle platform described above is a method for sharing the information obtained by a sensor of a vehicle with a device connected with the vehicle while communicating with one or more other vehicles, smart devices, infrastructures, smart home and personal apparatuses as disclosed in Korean Patent Publication No. 2018-0004030.

However, according to the conventional vehicle platform disclosed in the above-described Korean Patent Publication No. 2018-0004030, the smart home controlled by the vehicle platform only controls the devices in the home related to the vehicle such as opening a garage door or turning on a light, and may not provide an interface for controlling various home appliances in the home.

For this reason, the introduction of the autonomous vehicle and the in-vehicle window-type transparent display device has a problem in that they are not properly utilized even though the time and the interface enabling environment for precisely controlling home appliances in the home even in the vehicle have been provided.

Accordingly, there is a need for an apparatus and a method for providing an interface for controlling the home appliances in the home to a user free of driving operation in the vehicle as if in the home.

SUMMARY OF THE DISCLOSURE

An object of an embodiment of the present disclosure is to provide a virtual home service apparatus and method, which may provide a virtual home interface, which precisely reflects the information of the home where the user resides, rather than a simple interface by the communication between the home appliance in the home and the vehicle, which has been the cause of the above-described problem, thereby enabling experience as if controlling the home appliances within the actual home.

In addition, another object of an embodiment of the present disclosure is to provide a virtual home service apparatus and method, which may implement a user-specific virtual home interface by using the SLAM and photographic image obtained from a robot cleaner owned by the user.

The technical objects to be achieved in the present disclosure are not limited to the technical objects mentioned above, and other technical objects not described will be clearly understood by those skilled in the art from the following description.

For achieving the above objects, a virtual home service apparatus according to an embodiment of the present disclosure may implement a virtual home interface for providing home appliance control environment as if staying in a home by using a design drawing corresponding to an address of the user home and the SLAM and image provided from a robot cleaner.

Specifically, an embodiment of the present disclosure may be a virtual home service apparatus for providing data for supporting a virtual home interface to a vehicle apparatus for providing the virtual home interface for controlling an operation of a home appliance installed in a home including, a communicator, a home information collector for obtaining a design drawing of the home through the communicator based on user identification information of the home appliance, and obtaining a 3D drawing by converting the design drawing, a home appliance identifier for obtaining an internal image and SLAM information of the home through the communicator, and identifying the location and state of the home appliance based on the internal image and the SLAM information, and a virtual home implementator for generating virtual home information by reflecting the location and state of the home appliance to the 3D drawing, in which the virtual home information is provided to the vehicle apparatus as the data for supporting the virtual home interface.

An embodiment of the present disclosure may be the virtual home service apparatus in which the home information collector generates a design drawing request signal that requests the design drawing by using an address registered at the time of sale of the home appliance as the user identification information, and transmits the generated design drawing request signal to a real estate brokerage server through the communicator, and in which the communicator receives information comprising the design drawing from the real estate brokerage server.

An embodiment of the present disclosure may be the virtual home service apparatus in which the home information collector generates a design drawing request signal that requests the design drawing by using an address registered at the time of sale of the home appliance as the user identification information, and transmits the generated design drawing request signal to a real estate construction company server through the communicator, and in which the communicator receives information comprising the design drawing from the real estate construction company server.

An embodiment of the present disclosure may be the virtual home service apparatus in which the communicator receives the internal image and the SLAM information based on a downlink grant of a 5G network connected for operating a vehicle, in which the vehicle apparatus has been installed, in an autonomous driving mode, and in which the internal image and the SLAM information are provided from a robot cleaner disposed in the home connected to the 5G network.

An embodiment of the present disclosure may be the virtual home service apparatus further including a user interface for providing the virtual home interface, and in which the user interface includes a transparent display attached to a vehicle window.

An embodiment of the present disclosure may be the virtual home service apparatus in which the user interface obtains an input signal that controls the home appliance by voice recognition.

An embodiment of the present disclosure may be the virtual home service apparatus in which the user interface obtains an input signal that controls the home appliance by touch detection of an area of the transparent display where the home appliance has been displayed.

An embodiment of the present disclosure may be the virtual home service apparatus in which the user interface provides an interface for receiving additional home appliance information in the home, in which the home appliance identificator determines the unique characteristics of the additional home appliance according to the acquisition of the additional home appliance information through the user interface, defines an area where the robot cleaner will obtain updated internal image and updated SLAM information in the home based on the unique characteristics, obtains the updated internal image and the updated SLAM information through the communicator, and identifies the location and state of the additional home appliance based on the obtained updated internal image and updated SLAM information, in which the robot cleaner provides the updated internal image and the updated SLAM information only for the area defined by the home appliance identificator to the communicator, and in which the virtual home implementator updates the virtual home information by reflecting the location and state of the additional home appliance to the 3D drawing.

An embodiment of the present disclosure may be the virtual home service apparatus in which the user interface provides an interface for receiving an area designation signal that designates an area where the robot cleaner will obtain updated internal image and updated SLAM information in the home, in which the home appliance identificator defines an area where the robot cleaner will obtain the updated internal image and the updated SLAM information in the home based on the area designation signal input through the user interface, obtains the updated internal image and the updated SLAM information through the communicator, and identifies the location and state of the additional home appliance based on the obtained updated internal image and updated SLAM information, in which the robot cleaner provides the updated internal image and the updated SLAM information only for the area defined by the home appliance identificator to the communicator, and in which the virtual home implementator updates the virtual home information by reflecting the location and state of the additional home appliance to the 3D drawing.

An embodiment of the present disclosure may be a virtual home service method for providing data for supporting a virtual home interface to a vehicle apparatus for providing the virtual home interface for controlling an operation of a home appliance installed in a home including, a first operation that obtains a design drawing of the home based on user identification information of the home appliance, and obtains a 3D drawing by converting the design drawing, a second operation that obtains an internal image and SLAM information in the home, and identifies the location and state of the home appliance based on the internal image and the SLAM information, and a third operation that generates virtual home information by reflecting the location and state of the home appliance to the 3D drawing, in which the virtual home information is provided to the vehicle apparatus as the data for supporting the virtual home interface.

An embodiment of the present disclosure may be the virtual home service method in which the first operation includes generating a design drawing request signal that requests the design drawing by using an address registered at the time of sale of the home appliance as the user identification information, and transmitting the generated design drawing request signal to a real estate brokerage server, and receiving information including the design drawing from the real estate brokerage server.

An embodiment of the present disclosure may be the virtual home service method in which the first operation includes generating a design drawing request signal that requests the design drawing by using an address registered at the time of sale of the home appliance as the user identification information, and transmitting the generated design drawing request signal to a real estate construction company server, and receiving information including the design drawing from the real estate construction company server.

An embodiment of the present disclosure may be the virtual home service method in which the second operation includes receiving the internal image and the SLAM information based on a downlink grant of a 5G network connected for operating a vehicle, in which the vehicle apparatus has been installed, in an autonomous driving mode, and in which the internal image and the SLAM information are provided from a robot cleaner disposed in the home connected to the 5G network.

An embodiment of the present disclosure may be the virtual home service method further including a fourth operation that provides the virtual home interface, and in which the virtual home interface is provided through a transparent display attached to a vehicle window.

An embodiment of the present disclosure may be the virtual home service method in which the virtual home interface is a voice recognition interface for obtaining an input signal that controls the home appliance by voice recognition.

An embodiment of the present disclosure may be the virtual home service method in which the virtual home interface is a touch input interface for obtaining an input signal that controls the home appliance by touch detection of an area of the transparent display where the home appliance has been displayed.

An embodiment of the present disclosure may be the virtual home service method further including a fifth operation that provides an interface for receiving additional home appliance information in the home, a sixth operation that determines the unique characteristics of the additional home appliance according to the acquisition of the additional home appliance information, and defines an area where the robot cleaner will obtain updated internal image and updated SLAM information in the home based on the unique characteristics, a seventh operation that receives the updated internal image and the updated SLAM information only for an area defined by the sixth operation from the robot cleaner, an eighth operation that identifies the location and state of the additional home appliance based on the updated internal image and the updated SLAM information provided from the seventh operation, and a ninth operation that updates the virtual home information by reflecting the location and state of the additional home appliance to the 3D drawing.

An embodiment of the present disclosure may be the virtual home service method further including a tenth operation that provides an interface for receiving an area designation signal that designates an area where the robot cleaner will obtain updated internal image and updated SLAM information in the home, an eleventh operation that defines an area where the robot cleaner will obtain the updated internal image and the updated SLAM information in the home based on the area designation signal input through the user interface, a twelfth operation that receives the updated internal image and the updated SLAM information only for the area defined in the eleventh operation from the robot cleaner, a thirteenth operation that identifies the location and state of the additional home appliance based on the updated internal image and the updated SLAM information provided from the twelfth operation, and a fourteenth operation that updates the virtual home information by reflecting the location and state of the additional home appliance to the 3D drawing.

An embodiment of the present disclosure may be a computer readable recording medium recording a virtual home service program using a robot cleaner for providing data for supporting a virtual home interface to a vehicle apparatus for providing the virtual home interface for controlling an operation of a home appliance installed in a home including, a means for obtaining a design drawing of the home based on user identification information of the home appliance, and obtaining a 3D drawing by converting the design drawing, a means for obtaining an internal image and SLAM information in the home, and identifying the location and state of the home appliance based on the internal image and the SLAM information, and a means for generating virtual home information by reflecting the location and state of the home appliance to the 3D drawing, and in which the virtual home information is provided to the vehicle apparatus as the data for supporting the virtual home interface.

Specific details of other embodiments are included in the detailed description and the drawings.

According to an embodiment of the present disclosure, it is possible for the vehicle passenger to control the home appliance in the home by using the virtual home interface that reflects the actual in-home environment of the user as it is, thereby to control the home appliances in a familiar manner in the vehicle as if staying in the home.

According to an embodiment of the present disclosure, the user owning a robot cleaner may receive the virtual home interface that reflects the home appliances disposed in the actual home of the user as it is even without a separate apparatus.

An embodiment of the present disclosure is not limited to those described above, and other embodiments not described will be clearly understood from the following description.

DETAILED DESCRIPTION

Figure 1:
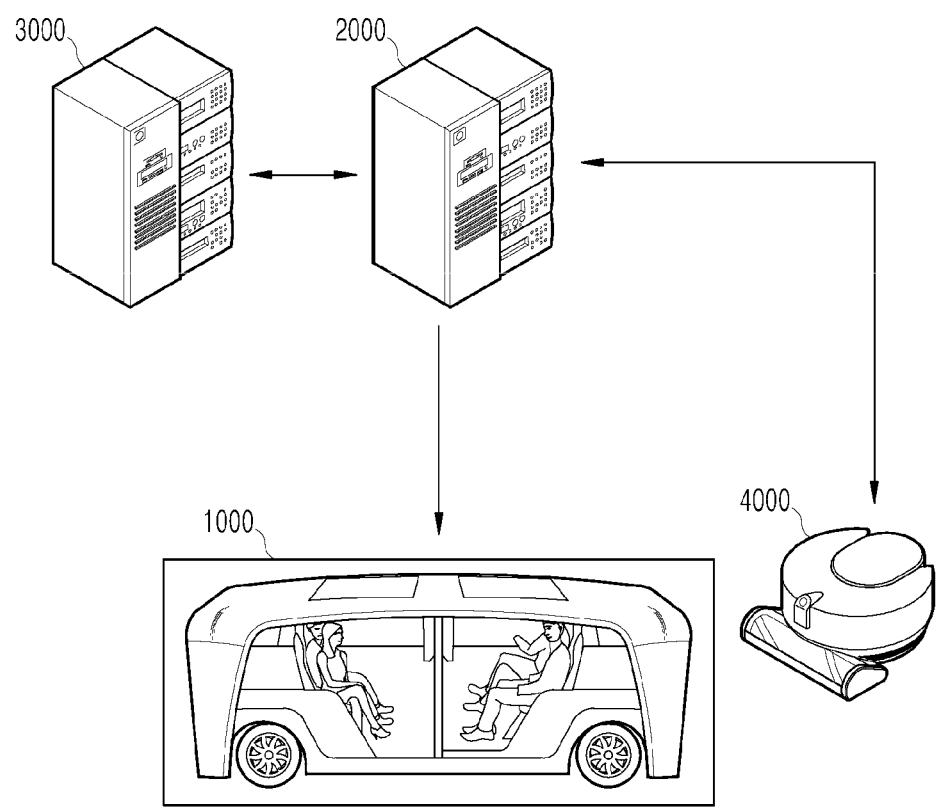
FIG. 1 is a diagram illustrating a system to which a virtual home service apparatus according to an embodiment of the present disclosure is applied.

Hereinafter, embodiments of the present disclosure will be described in detail with reference to the accompanying drawings. Like reference numerals refer to the like elements throughout and a duplicate description thereof is omitted. Suffixes "module" and "unit or portion" for elements used in the following description are merely provided for facilitation of preparing this specification, and thus they are not granted a specific meaning or function. In the following description of the embodiments disclosed herein, the detailed description of related known technology will be omitted when it may obscure the subject matter of the embodiments according to the present disclosure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. Furthermore, these terms such as "first," "second," and other numerical terms, are used only to distinguish one element from another element.

When an element or layer is referred to as being "on," "engaged to," "connected to," or "coupled to" another element or layer, it may be directly on, engaged, connected, or coupled to the other element or layer, or intervening elements or layers may be present. The terms "connected" and "coupled" are not restricted to physical or mechanical connections or couplings, and may include electrical connections or couplings, whether direct or indirect. The connection may be such that the objects are permanently connected or releasably connected.

It must be noted that as used herein and in the appended claims, the singular forms "a," "an," and "the" include the plural references unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A vehicle described in this specification refers to a car, an automobile, and the like. Hereinafter, the vehicle will be exemplified as a car.

The vehicle described in the specification may include, but is not limited to, a vehicle having an internal combustion engine as a power source, a hybrid vehicle having an engine and an electric motor as a power source, and an electric vehicle having an electric motor as a power source.

FIG. 1 is a diagram illustrating a system to which a virtual home service apparatus according to an embodiment of the present disclosure is applied.

Referring to FIG. 1, a mobility vehicle 1000 may communicate with a server 2000 by executing a virtual home application installed in a vehicle.

The server 2000 may receive and store design drawings from an external server 3000 having the design drawings, for example, a real estate brokerage server or a real estate construction company server, and use the stored design drawings when generating virtual home information.

The server 2000 may include a Message Queuing Telemetry Transport (MQTT) server for communicating with a home appliance including a robot cleaner 4000 for providing images and SLAM information.

Here, as illustrated in FIG. 1, the mobility vehicle 1000 may receive virtual home information necessary for implementing a virtual home interface through the server 2000, but directly generate the virtual home information by processing the design drawings, images, and SLAM information collected from the external server 3000 and the robot cleaner 4000 without supporting of the server 2000.

In the case of a passenger of the vehicle 1000 that does not own the robot cleaner 4000, a default virtual home interface may be provided by using a list of home Internet of Things (IoT) home appliances that are interlocked with the server 2000.

Figure 2:
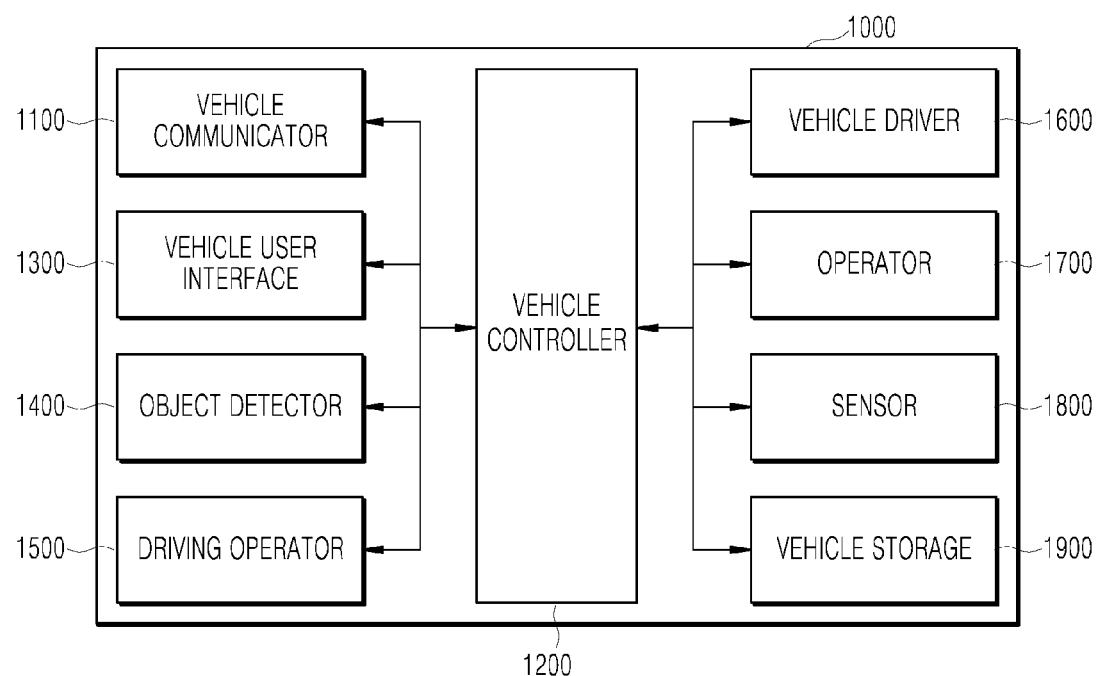
FIG. 2 is a block diagram illustrating a virtual home service apparatus installed at a vehicle side according to an embodiment of the present disclosure.

FIG. 2 is a block diagram illustrating a virtual home service apparatus installed at a vehicle side according to an embodiment of the present disclosure.

Referring to FIG. 2, the virtual home service apparatus may include a vehicle communicator 1100, a vehicle controller 1200, a vehicle user interface 1300, an object detector 1400, a driving operator 1500, a vehicle driver 1600, an operator 1700, a sensor 1800, and a vehicle storage 1900.

According to an embodiment, the vehicle 1000 to which the virtual home service apparatus is applied may include other constituent elements in addition to the constituent elements illustrated in FIG. 2 and described below, or may not include some of the constituent elements illustrated in FIG. 2 and described below.

The vehicle 1000 may be switched from an autonomous driving mode to a manual mode or from the manual mode to the autonomous driving mode according to the driving situation. Here, the driving situation may be determined by at least one of information received by the vehicle communicator 1100, external object information detected by the object detector 1400, or navigation information obtained by a navigation module.

The vehicle 1000 may be switched from the autonomous driving mode to the manual mode or from the manual mode to the autonomous driving mode according to a user input received through the vehicle user interface 1300.

When the vehicle 1000 is operated in the autonomous driving mode, the vehicle 1000 may be operated under a control of the operator 1700 for controlling driving, leaving, and parking. On the other hand, when the vehicle 1000 is operated in the manual mode, the vehicle 1000 may be operated by an input through a mechanical driving manipulation of the driver.

The vehicle communicator 1100 is a module for communicating with an external apparatus. Here, the external apparatus may be the servers 2000, 3000 and home appliances such as the robot cleaner 4000.

The vehicle communicator 1100 may receive the virtual home information, the design drawings provided by the server 3000, the internal image and the Simultaneous Localization And Mapping (SLAM) information obtained by the robot cleaner 4000 based on the downlink grant of the 5G network from the server 2000.

The vehicle communicator 1100 may receive information including the design drawings of the user home from a real estate brokerage server or a real estate construction company server among the external servers 3000.

The vehicle communicator 1100 may include at least one of a transmission antenna, a reception antenna, a radio frequency (RF) circuit or an RF element capable of implementing various communication protocols, in order to perform communication.

The vehicle communicator 1100 may perform short-range communication, GPS signal reception, V2X communication, optical communication, broadcast transmission and reception, and Intelligent Transport Systems (ITS) communication functions.

According to an embodiment, the vehicle communicator 1100 may further support other functions in addition to the described functions, or may not support some of the described functions.

The vehicle communicator 1100 may support short-range communication by using at least one of Bluetooth™, Radio Frequency Identification (RFID), Infrared Data Association (IrDA), Ultra WideBand (UWB), ZigBee, Near Field Communication (NFC), Wireless-Fidelity (Wi-Fi), Wi-Fi Direct, or Wireless Universal Serial Bus (Wireless USB) technologies.

The vehicle communicator 1100 may form short-range wireless communication networks so as to perform short-range communication between the vehicle 1000 and at least one external device.

The vehicle communicator 1100 may include a Global Positioning System (GPS) module or a Differential Global Positioning System (DGPS) module for obtaining location information of the vehicle 1000.

The vehicle communicator 1100 may include a module for supporting wireless communication between the vehicle 1000 and a server (V2I: vehicle to infrastructure), communication with another vehicle (V2V: vehicle to vehicle) or communication with a pedestrian (V2P: vehicle to pedestrian). That is, the vehicle communicator 1100 may include a V2X communication module. The V2X communication module may include an RF circuit capable of implementing V2I, V2V, and V2P communication protocols.

The vehicle communicator 1100 may receive a danger information broadcast signal transmitted by another vehicle, transmit a danger information query signal, and receive a danger information response signal in response thereto through the V2X communication module.

The vehicle communicator 1100 may include an optical communication module for performing communication with an external device via light. The optical communication module may include both a light transmitting module for converting electrical signals into optical signals and transmitting the optical signals to the outside, and a light receiving module for converting the received optical signals into electrical signals.

According to an embodiment, the light transmitting module may be integrally formed with a lamp included in the vehicle 1000.

The vehicle communicator 1100 may include a broadcast communication module for receiving broadcast signals from an external broadcast management server, or transmitting broadcast signals to the broadcast management server through broadcast channels. Examples of the broadcast channels may include a satellite channel and a terrestrial channel. Example of the broadcast signal may include a TV broadcast signal, a radio broadcast signal, and a data broadcast signal.

The vehicle communicator 1100 may include an ITS communication module that exchanges information, data or signals with a traffic system. The ITS communication module may provide the obtained information and data to the traffic system. The ITS communication module may receive information, data, or signals from the traffic system. For example, the ITS communication module may receive road traffic information from the communication system and provide the road traffic information to the vehicle controller 1200. For example, the ITS communication module may receive control signals from the traffic system and provide the control signals to the vehicle controller 1200 or a processor provided in the vehicle 1000.

Depending on the embodiment, the overall operation of each module of the vehicle communicator 1100 may be controlled by a separate process provided in the vehicle communicator 1100. The vehicle communicator 1100 may include a plurality of processors, or may not include a processor. When a processor is not included in the vehicle communicator 1100, the vehicle communicator 1100 may be operated by either a processor of another apparatus in the vehicle 1000 or the vehicle controller 1200.

The vehicle communicator 1100 may, together with the vehicle user interface 1300, implement a vehicle-use display device. In this case, the vehicle-use display device may be referred to as a telematics device or an audio image navigation (AVN) device.

Figure 5:
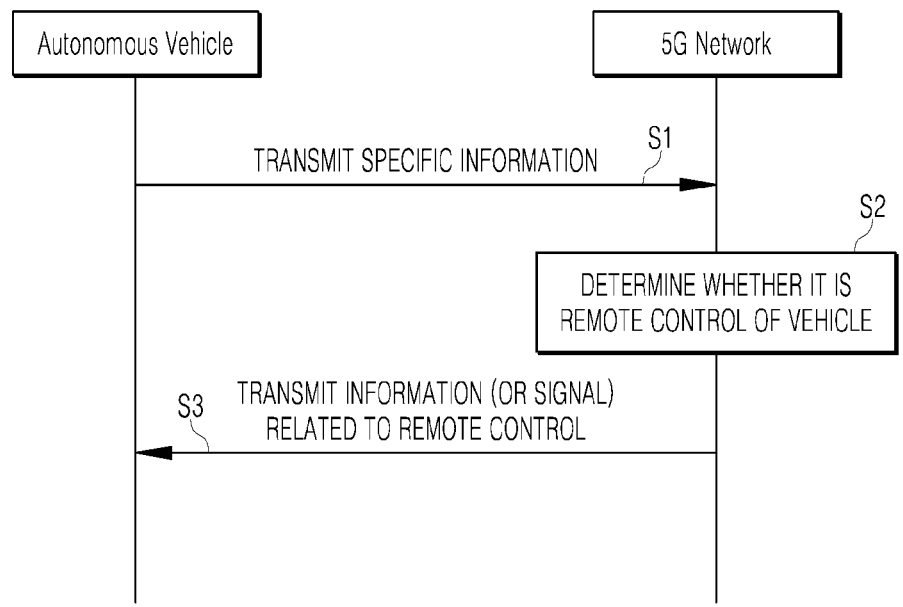
FIG. 5 is a diagram illustrating an example of basic operations of an autonomous vehicle and a 5G network in a 5G communication system.
Figure 6:
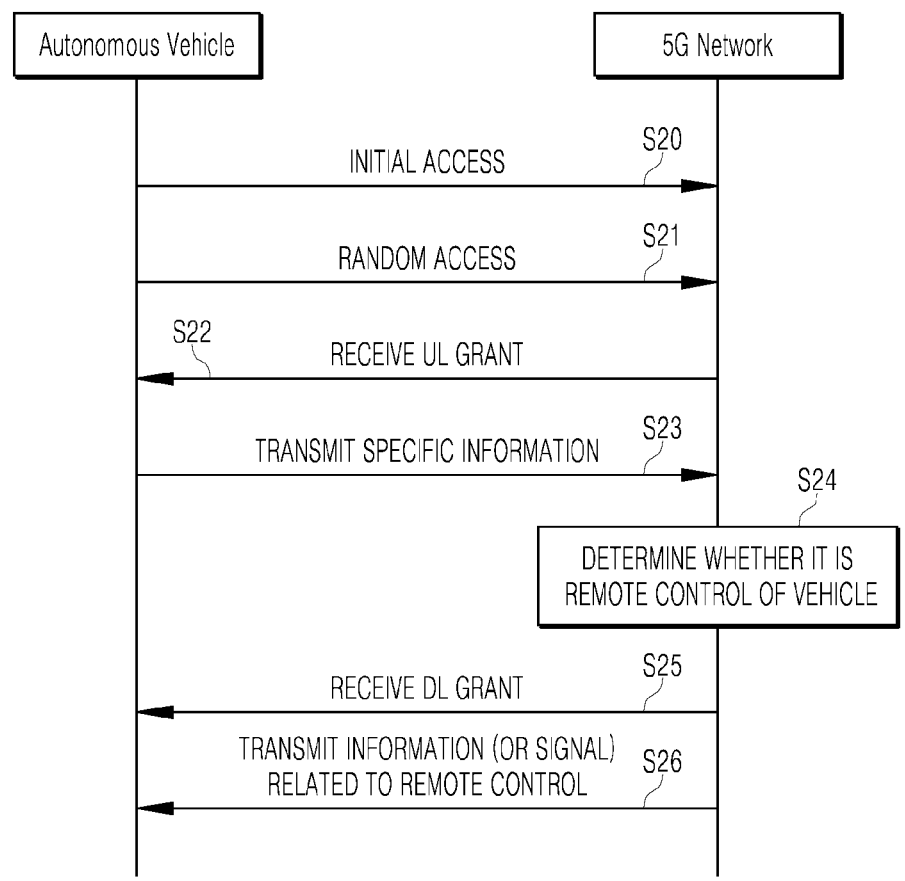
FIG. 6 is a diagram illustrating an example of application operations of the autonomous vehicle and the 5G network in the 5G communication system.

FIG. 5 is a diagram illustrating an example of basic operations of an autonomous vehicle and a 5G network in a 5G communication system.

The vehicle communicator 1100 may transmit specific information over a 5G network when the vehicle 1000 is operated in the autonomous driving mode.

The specific information may include autonomous driving related information.

The autonomous driving related information may be information directly related to the driving control of the vehicle. For example, the autonomous driving related information may include at least one of object data indicating an object near the vehicle, map data, vehicle status data, vehicle location data, or driving plan data.

The autonomous driving related information may further include service information necessary for autonomous driving. For example, the specific information may include information on a destination inputted through the user terminal 1300 and a safety rating of the vehicle.

In addition, the 5G network may determine whether a vehicle is to be remotely controlled (S2).

The 5G network may include a server or a module for performing remote control related to autonomous driving.

The 5G network may transmit information (or a signal) related to the remote control to an autonomous driving vehicle (S3).

As described above, information related to the remote control may be a signal directly applied to the autonomous driving vehicle, and may further include service information necessary for autonomous driving. The autonomous driving vehicle according to this embodiment may receive service information such as insurance for each interval selected on a driving route and risk interval information, through a server connected to the 5G network to provide services related to the autonomous driving.

An essential process for performing 5G communication between the autonomous driving vehicle 1000 and the 5G network (for example, an initial access process between the vehicle 1000 and the 5G network) will be briefly described below with reference to FIGS. 6 to 10.

An example of application operations through the autonomous driving vehicle 1000 performed in the 5G communication system and the 5G network is as follows.

The vehicle 1000 may perform an initial access process with the 5G network (initial access step, S20). The initial access process may include a cell search process for downlink (DL) synchronization acquisition and a process for obtaining system information.

The vehicle 1000 may perform a random access process with the 5G network (random access step, S21). The random access process may include a process for uplink (UL) synchronization acquisition or a preamble transmission process for UL data transmission, or a random access response receiving process.

The 5G network may transmit an Uplink (UL) grant for scheduling transmission of specific information to the autonomous driving vehicle 1000 (UL grant receiving step, S22).

The process in which the vehicle 1000 receives the UL grant may include a scheduling process for receiving a time/frequency source for the transmission of the UL data over the 5G network.

The autonomous driving vehicle 1000 may transmit specific information over the 5G network based on the UL grant (specific information transmission step, S23).

The 5G network may determine whether the vehicle 1000 is to be remotely controlled based on the specific information transmitted from the vehicle 1000 (vehicle remote control determination step, S24).

The autonomous driving vehicle 1000 may receive the DL grant through a physical DL control channel for receiving a response on pre-transmitted specific information from the 5G network (DL grant receiving step, S25).

The 5G network may transmit information (or a signal) related to the remote control to the autonomous driving vehicle 1000 based on the DL grant (remote control related information transmission step, S26).

A process in which the initial access process and/or the random access process between the 5G network and the autonomous driving vehicle 1000 is combined with the DL grant receiving process has been exemplified. However, the present disclosure is not limited thereto.

For example, the initial access process and/or the random access process may be performed through the initial access step, the UL grant receiving step, the specific information transmission step, the vehicle remote control determination step, and the remote control related information transmission step. In addition, for example, the initial access process and/or the random access process may be performed through the random access step, the UL grant receiving step, the specific information transmission step, the vehicle remote control determination step, and the remote control related information transmission step. The autonomous driving vehicle 1000 may be controlled by the combination of an AI operation and the DL grant receiving process through the specific information transmission step, the vehicle remote control determination step, the DL grant receiving step, and the remote control related information transmission step.

The operation of the autonomous driving vehicle 1000 described above is merely exemplary, but the present disclosure is not limited thereto.

For example, the operation of the autonomous driving vehicle 1000 may be performed by selectively combining the initial access step, the random access step, the UL grant receiving step, or the DL grant receiving step with the specific information transmission step, or the remote control related information transmission step. The operation of the autonomous driving vehicle 1000 may include the random access step, the UL grant receiving step, the specific information transmission step, and the remote control related information transmission step. The operation of the autonomous driving vehicle 1000 may include the initial access step, the random access step, the specific information transmission step, and the remote control related information transmission step. The operation of the autonomous driving vehicle 1000 may include the UL grant receiving step, the specific information transmission step, the DL grant receiving step, and the remote control related information transmission step.

Figure 7:
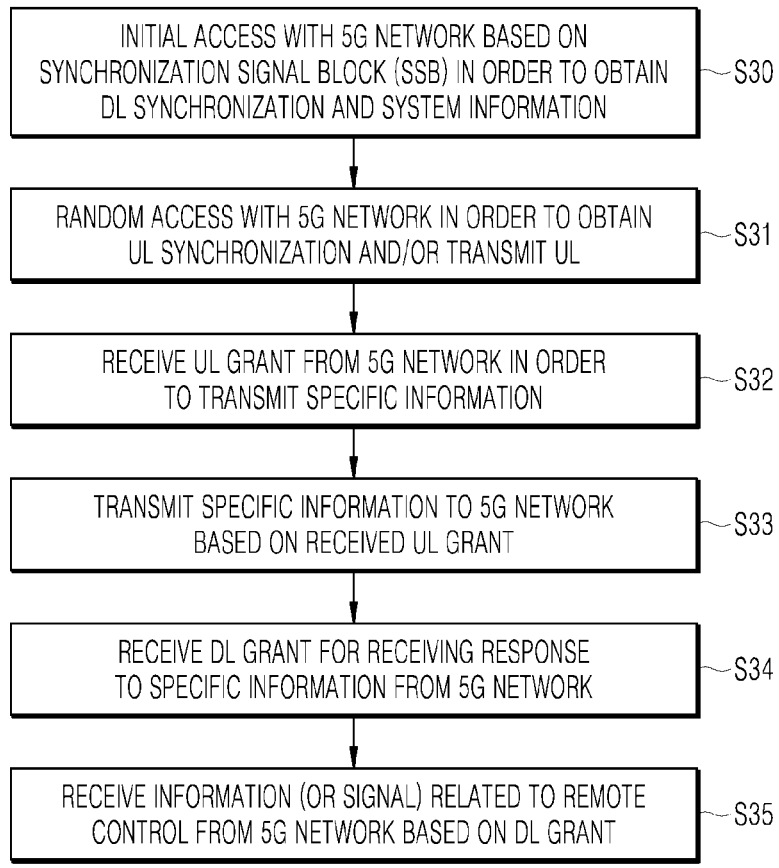
FIGS. 7 to 10 are diagrams illustrating an example of an operation of the autonomous vehicle using the 5G communication.

As illustrated in FIG. 7, the vehicle 1000 including an autonomous driving module may perform an initial access process with the 5G network based on Synchronization Signal Block (SSB) in order to obtain DL synchronization and system information (initial access step).

The autonomous driving vehicle 1000 may perform a random access process with the 5G network for UL synchronization acquisition and/or UL transmission (random access step, S31).

The autonomous driving vehicle 1000 may receive the UL grant from the 5G network for transmitting specific information (UL grant receiving step, S32).

The autonomous driving vehicle 1000 may transmit the specific information to the 5G network based on the UL grant (specific information transmission step, S33).

The autonomous driving vehicle 1000 may receive the DL grant from the 5G network for receiving a response to the specific information (DL grant receiving step, S34).

The autonomous driving vehicle 1000 may receive remote control related information (or a signal) from the 5G network based on the DL grant (remote control related information receiving step, S35).

A beam management (BM) process may be added to the initial access step, and a beam failure recovery process associated with Physical Random Access Channel (PRACH) transmission may be added to the random access step. QCL (Quasi Co-Located) relation may be added with respect to the beam reception direction of a Physical Downlink Control Channel (PDCCH) including the UL grant in the UL grant receiving step, and QCL relation may be added with respect to the beam transmission direction of the Physical Uplink Control Channel (PUCCH)/Physical Uplink Shared Channel (PUSCH) including specific information in the specific information transmission step. In addition, QCL relation may be added with respect to the beam reception direction of the PDCCH including the DL grant in the DL grant receiving step.

Figure 8:
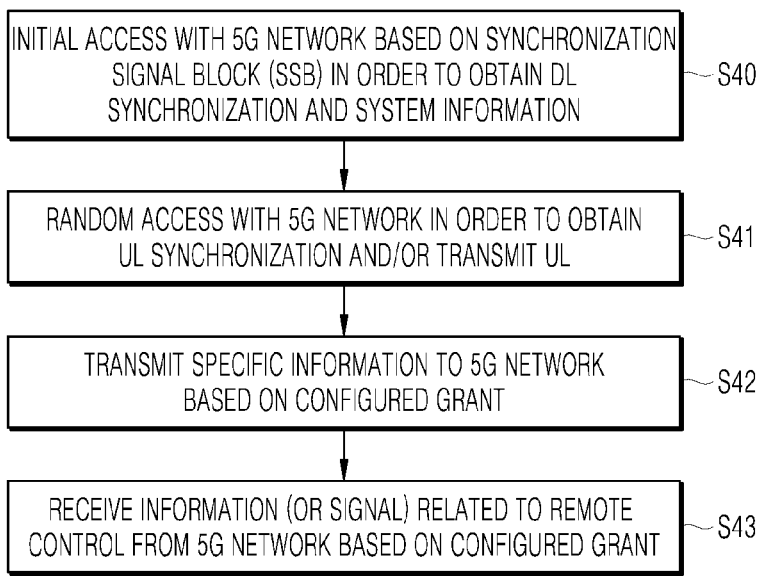

As illustrated in FIG. 8, the autonomous driving vehicle 1000 may perform an initial access process with the 5G network based on SSB for acquiring DL synchronization and system information (initial access step, S40).

The autonomous driving vehicle 1000 may perform a random access process with the 5G network for UL synchronization acquisition and/or UL transmission (random access step, S41).

The autonomous driving vehicle 1000 may transmit specific information based on a configured grant to the 5G network (UL grant receiving step, S42). In other words, the autonomous driving vehicle 1000 may receive the configured grant instead of receiving the UL grant from the 5G network.

The autonomous driving vehicle 1000 may receive the remote control related information (or a signal) from the 5G network based on the configured grant (remote control related information receiving step, S43).

Figure 9:
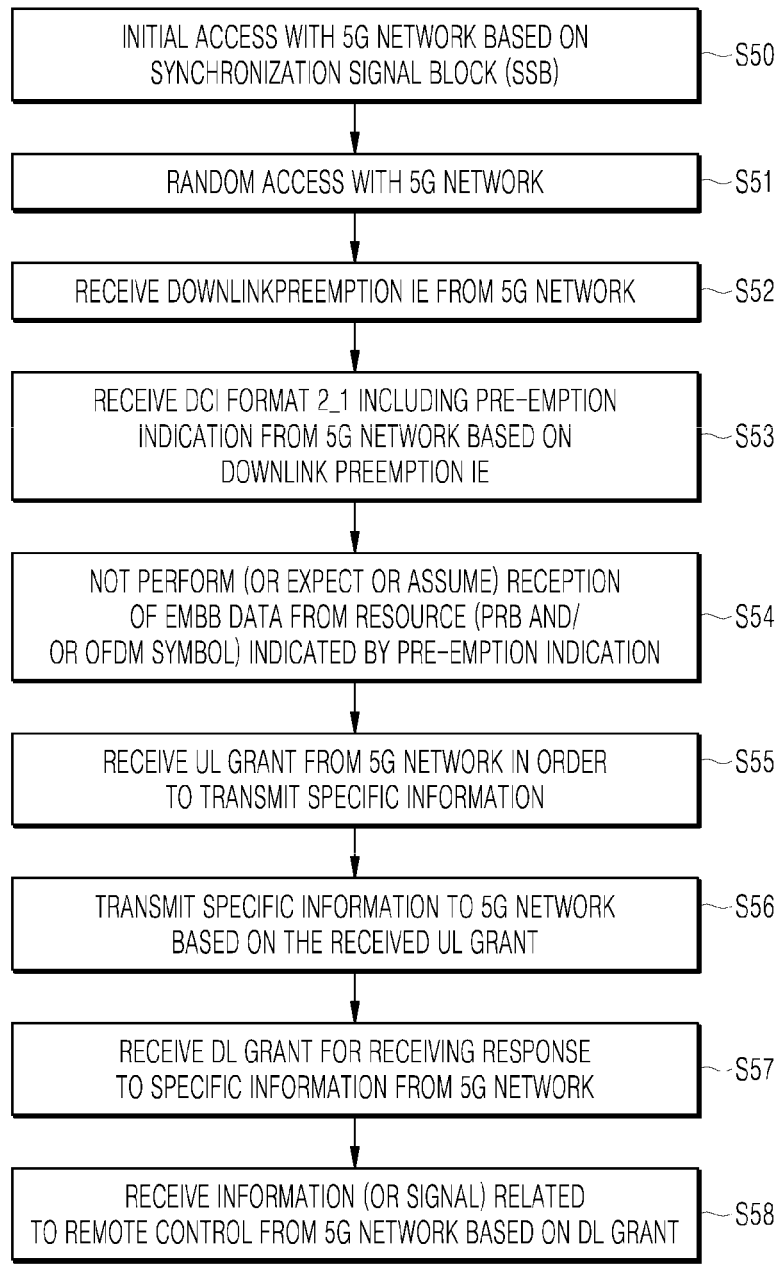

As illustrated in FIG. 9, the autonomous driving vehicle 1000 may perform an initial access process with the 5G network based on the SSB for acquiring the DL synchronization and the system information (initial access step, S50).

The autonomous driving vehicle 1000 may perform a random access process with the 5G network for UL synchronization acquisition and/or UL transmission (random access step, S51).

In addition, the autonomous driving vehicle 1000 may receive Downlink Preemption (DL) and Information Element (IE) from the 5G network (DL Preemption IE reception step, S52).

The autonomous driving vehicle 1000 may receive DCI (Downlink Control Information) format 2_1 including preemption indication based on the DL preemption IE from the 5G network (DCI format 2_1 receiving step, S53).

The autonomous driving vehicle 1000 may not perform (or expect or assume) the reception of eMBB data in the resource (PRB and/or OFDM symbol) indicated by the pre-emption indication (step of not receiving eMBB data, S54).

The autonomous driving vehicle 1000 may receive the UL grant over the 5G network for transmitting specific information (UL grant receiving step, S55).

The autonomous driving vehicle 1000 may transmit the specific information to the 5G network based on the UL grant (specific information transmission step, S56).

The autonomous driving vehicle 1000 may receive the DL grant from the 5G network for receiving a response to the specific information (DL grant receiving step, S57).

The autonomous driving vehicle 1000 may receive the remote control related information (or signal) from the 5G network based on the DL grant (remote control related information receiving step, S58).

Figure 10:
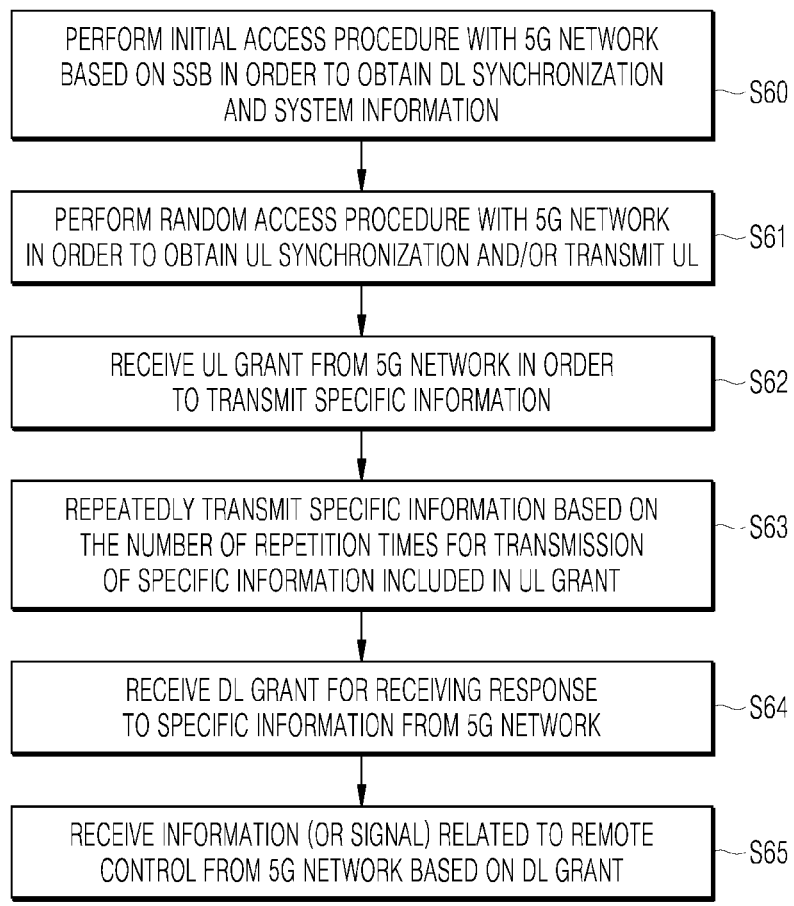

As illustrated in FIG. 10, the autonomous driving vehicle 1000 may perform an initial access process with the 5G network based on SSB for acquiring DL synchronization and system information (initial access step, S60).

The autonomous driving vehicle 1000 may perform a random access process with the 5G network for UL synchronization acquisition and/or UL transmission (random access step, S61).

The autonomous driving vehicle 1000 may receive the UL grant over the 5G network for transmitting specific information (UL grant receiving step, S62).

When specific information is transmitted repeatedly, the UL grant may include information on the number of repetitions, and the specific information may be repeatedly transmitted based on information on the number of repetitions (specific information repetition transmission step, S63).

The autonomous driving vehicle 1000 may transmit the specific information to the 5G network based on the UL grant.

The repeated transmission of the specific information may be performed by frequency hopping, and the first transmission of the specific information may be performed from a first frequency source, and the second transmission of the specific information may be performed from a second frequency source.

The specific information may be transmitted through Narrowband of Resource Block (6RB) and Resource Block (1RB).

The autonomous driving vehicle 1000 may receive the DL grant from the 5G network for receiving a response to the specific information (DL grant receiving step, S64).

The autonomous driving vehicle 1000 may receive the remote control related information (or signal) from the 5G network based on the DL grant (remote control related information receiving step, S65).

The above-described 5G communication technique may be applied in combination with the embodiment proposed in this specification, which will be described in FIG. 1 to FIG. 13*f*, or supplemented to specify or clarify the technical feature of the embodiment proposed in this specification.

The vehicle 1000 may be connected to an external server through a communication network, and may be capable of moving along a predetermined route without a driver's intervention by using an autonomous driving technique.

In the embodiment described below, a user may be interpreted as a driver, a passenger, or an owner of a user terminal.

While the vehicle 1000 is driving in the autonomous driving mode, the type and frequency of accident occurrence may depend on the capability of the vehicle 1000 of sensing dangerous elements in the vicinity in real time. The route to the destination may include intervals with different levels of risk based on various causes, such as weather, terrain characteristic, and traffic congestion.

At least one of an autonomous driving vehicle, a user terminal, or a server according to embodiments of the present disclosure may be associated or integrated with an artificial intelligence module, a drone (unmanned aerial vehicle (UAV)), a robot, an augmented reality (AR) device, a virtual reality (VR) device, a 5G service related device, and the like.

For example, the vehicle 1000 may operate in association with at least one artificial intelligence module or robot included in the vehicle 1000 in the autonomous driving mode.

For example, the vehicle 1000 may interact with at least one robot. The robot may be an autonomous mobile robot (AMR) capable of driving by itself. Being capable of driving by itself, the AMR may freely move, and may include a plurality of sensors so as to avoid obstacles during driving. The AMR may be a flying robot (such as a drone) equipped with a flight device. The AMR may be a wheel-type robot equipped with at least one wheel, and which is moved through the rotation of the at least one wheel. The AMR may be a leg-type robot equipped with at least one leg, and which is moved using the at least one leg.

The robot may function as a device that enhances the convenience of a user of a vehicle. For example, the robot may move a load placed in the vehicle 1000 to a final destination. For example, the robot may perform a function of providing route guidance to a final destination to a user who alights from the vehicle 1000. For example, the robot may perform a function of transporting the user who alights from the vehicle 1000 to the final destination At least one electronic apparatus included in the vehicle 1000 may communicate with the robot through a communication device.

At least one electronic apparatus included in the vehicle 1000 may provide, to the robot, data processed by the at least one electronic apparatus included in the vehicle 1000. For example, at least one electronic apparatus included in the vehicle 1000 may provide, to the robot, at least one among object data indicating an object near the vehicle, HD map data, vehicle status data, vehicle location data, and driving plan data.

At least one electronic apparatus included in the vehicle 1000 may receive, from the robot, data processed by the robot. At least one electronic apparatus included in the vehicle 1000 may receive at least one of sensing data sensed by the robot, object data, robot status data, robot location data, or robot movement plan data.

At least one electronic apparatus included in the vehicle 1000 may generate a control signal based on data received from the robot. For example, at least one electronic apparatus included in the vehicle may compare information on the object generated by an object detection device with information on the object generated by the robot, and generate a control signal based on the comparison result. At least one electronic apparatus included in the vehicle 1000 may generate a control signal so that interference between the vehicle movement route and the robot movement route may not occur.

At least one electronic apparatus included in the vehicle 1000 may include a software module or a hardware module for implementing an artificial intelligence (AI) (hereinafter referred to as an artificial intelligence module). At least one electronic apparatus included in the vehicle 1000 may input obtained data into the artificial intelligence module, and use data outputted from the artificial intelligence module.

The artificial intelligence module may perform machine learning of input data by using at least one artificial neural network (ANN). The artificial intelligence module may output driving plan data through machine learning of input data.

At least one electronic apparatus included in the vehicle 1000 may generate a control signal based on the data outputted from the artificial intelligence module.

According to the embodiment, at least one electronic apparatus included in the vehicle 1000 may receive data processed by an artificial intelligence from an external device through a communication device. At least one electronic apparatus included in the vehicle may generate a control signal based on the data processed by the artificial intelligence.

The vehicle controller 1200 may include a home information collection module, a home appliance identification module, and a virtual home implementation module.

The vehicle controller 1200 may receive a control signal of the server 2000 through the vehicle communicator 1100, and control the autonomous driving mode operation according to the control signal.

The vehicle controller 1200 may provide a virtual home interface for controlling an operation of the home appliance installed in the home through the vehicle user interface 1300.

The home information collection module of the vehicle controller 1200 may obtain the design drawing of the home provided by the external server 3000 through the vehicle communicator 1100 based on the user identification information of the home appliance, and obtain the 3D drawing by converting the design drawing.

The home information collection module of the vehicle controller 1200 may convert a two-dimensional design drawing into a 3D drawing according to a line processing method, a surface processing method, and a sphere processing method.

At this time, the line processing method is represented by a line segment connecting the points, the surface processing method is represented by a surface by connecting the line segments, and the sphere processing method is represented by a sphere by connecting the surfaces.

At this time, the sphere processing method includes a Constructive Solid Geometry (CGS), a Boundary Representation (B-Rep), and a Cell Decomposition method. The Constructive Solid Geometry (CGS) creates a sphere by using sets (sum, common, subset) concept while designating a location by using predetermined primitives (hexahedron, cone, cylinder, sphere, etc.). The Boundary Representation forms a sphere by using a line and a surface. In addition, the Cell Decomposition method is represented by their sets by successively decomposing a complex structure into parts having different characteristics from each other (e.g., regular hexagon, triangular pillar, block, etc.).

The home information collection module of the vehicle controller 1200 may generate a design drawing request signal for requesting the design drawing of the user home by using an address registered at the time of sale of the home appliance as user identification information, and transmit the generated design drawing request signal to a real estate brokerage server among the external servers 3000 through the vehicle communicator 1100. In particular, when the user home is an apartment, the home information collection module of the vehicle controller 1200 may receive the design drawing of the floor space corresponding to the apartment name, the building number and the room number, in which the user resides, from the real estate brokerage server by using the address information.

The home information collection module of the vehicle controller 1200 may generate the design drawing request signal for requesting the design drawing of the user home by using the address registered at the time of sale of the home appliance as user identification information, and transmit the generated design drawing request signal to a real estate construction company server among the external servers 3000 through the vehicle communicator 1100. In particular, when the user home is a house sold by a large construction company, the home information collection module of the vehicle controller 1200 may receive the design drawing corresponding to the house sold to the user from the real estate construction company server by using the address information.

The home appliance identification module of the vehicle controller 1200 may obtain the internal image and the SLAM information of the home through the vehicle communicator 1100, and identify the location and state of the home appliance based on the internal image and the SLAM information.

At this time, the home appliance identification module of the vehicle controller 1200 may supplement the 3D drawing generated by the home information collection module by using the SLAM information.

The home appliance identification module of the vehicle controller 1200 may determine the unique characteristic of the additional home appliance according to the acquisition of the additional home appliance information through the vehicle user interface 1300, define an area where the robot cleaner will obtain the updated internal image and the updated SLAM information in the home based on the unique characteristics, obtain the updated internal image and the updated SLAM information through the vehicle communicator 1100, and identify the location and state of the additional home appliance based on the obtained updated internal image and the updated SLAM information.

For example, if the additional home appliance input through the vehicle user interface 1300 is a washing machine, the home appliance identification module of the vehicle controller 1200 may use the internal image and the SLAM information, which have been obtained by driving the robot cleaner 4000 only in a place where the washing machine is likely to be disposed according to the unique characteristics of the washing machine, for example, in a utility room, for identifying the location and state of the washing machine. On the other hand, the home appliance identification module of the vehicle controller 1200 may use the internal image and the SLAM information, which have been obtained by driving the robot cleaner 4000 only in the other space than a place where the washing machine is less likely to be disposed, for example, the bedroom in the above case, for identifying the location and state of the washing machine.

The home appliance identification module of the vehicle controller 1200 may define an area where the robot cleaner 4000 will obtain the updated internal image and the updated SLAM information in the home based on an area designation signal input through the vehicle user interface 1300, obtain the updated internal image and the updated SLAM information through the vehicle communicator 1100, and identify the location and state of the additional home appliance based on the obtained updated internal image and updated SLAM information.

In the home appliance identification module of the vehicle controller 1200, when the user designates a space that needs to be updated, for example, two bedrooms and a living room, through the vehicle user interface 1300, the robot cleaner 4000 may obtain the internal image and the SLAM information only for the designated space, thereby saving the time required for the operation of the robot cleaner 4000, and accordingly, it is possible to identify the location and state of the additional home appliance within a fast time compared with obtaining the internal image and SLAM information for the entire home.

The virtual home implementation module of the vehicle controller 1200 may generate virtual home information by reflecting the location and state of the home appliance to the 3D drawing generated by the home information collection module. Here, the virtual home information may be provided as data for supporting the virtual home interface provided through the vehicle user interface 1300.

The virtual home implementation module of the vehicle controller 1200 may update the virtual home information by reflecting the location and state of the additional home appliance, which has been identified based on the area designated by the user in the home appliance identification module or the unique characteristics of the additional home appliance, to the 3D drawing.

When receiving from the vehicle user interface 1300 an input signal, particularly, an input signal that controls the home appliance disposed in the home, for example, the voice command such as "Turn off the TV." or "Close the refrigerator." by the voice recognition, the vehicle controller 1200 may generate a signal that controls the device responding to a voice command, for example, a TV to be turned off or the robot cleaner 4000 that will perform a closing operation of a refrigerator, and transmit the generated control signal through the vehicle communicator 1100.

When receiving from the vehicle user interface 1300 an input signal for driving the virtual home application, for example, a voice command such as "Our home control." by the voice recognition, the vehicle controller 1200 may activate the virtual home application, which is an application capable of controlling the home appliance disposed in the home, stored in the vehicle storage 1900.

When receiving from the vehicle user interface 1300 an input signal that controls the home appliance obtained by touch detection of an area of the transparent display where the home appliance within the home has been displayed, the vehicle controller 1200 may generate a signal that controls the device corresponding to the input signal, and transmit the generated control signal through the vehicle communicator 1100.

The vehicle controller 1200 may be implemented using at least one of application specific integrated circuits (ASICs), digital signal processors (DSPs), digital signal processing devices (DSPDs), programmable logic devices (PLDs), field [programmable gate arrays (FPGAs), processors, controllers, micro-controllers, microprocessors, or other electronic units for performing other functions.

The user interface 1300 may allow interaction between the vehicle 1000 and a vehicle user, receive an input signal of the user, transmit the received input signal to the vehicle controller 1200, and provide information included in the vehicle 1000 to the user under the control of the vehicle controller 1200. The vehicle user interface 1300 may include an input module, an internal camera, a biometric sensing module, and an output module, but is not limited thereto.

The vehicle user interface 1300 may provide a virtual home interface that enables the user to control the home appliance in the home while providing experience within the vehicle as if a user is staying in the home.

The vehicle user interface 1300 may receive additional home appliance information such as a home appliance newly purchased by a user in the home through an interface provided by the virtual home application or a separate interface from the user.

The vehicle user interface 1300 may receive the area designation signal for designating an area where the robot cleaner 4000 will obtain the updated internal image and the updated SLAM information in the home, for example, a bedroom, a living room, etc. through an interface provided from the virtual home application or a separate interface from the user.

The input module is for receiving information from the user, and the data collected by the input module may be analyzed by the vehicle controller 1200 to be processed as the control command of the user.

The input module may include a microphone, and may receive an input signal by the voice recognition, particularly, an input signal that controls the home appliance disposed in the home, for example, a voice command such as "Turn off the TV." or "Close the refrigerator." to provide it to the vehicle controller 1200.

The input module may receive an input signal for driving the virtual home application from the user, for example, a voice command such as "Our home control." to provide it to the vehicle controller 1200.

The input module may receive the destination of the vehicle 1000 from the user to provide it to the vehicle controller 1200.

The input module may input a signal for designating and deactivating at least one sensor module of the plurality of sensor modules of the object detector 1400 to the vehicle controller 1200 according to the user input.

The input module may be disposed inside the vehicle. For example, the input module may be disposed in an area of a steering wheel, an area of an instrument panel, an area of a seat, an area of each pillar, an area of a door, an area of the center console, an area of a head lining, an area of a sun visor, an area of a windshield, or an area of a window, etc.

The output module is for generating output related to vision, auditory sense or tactile sensation. The output module may output a sound or an image.

The output module may include at least one of a display module, a sound output module, or a haptic output module.

The display module may display a graphic object corresponding to various information.

The display module may include at least one of a Liquid Crystal Display (LCD), a Thin Film Transistor Liquid Crystal Display (TFT LCD), an Organic Light-Emitting Diode (OLED), a Flexible Display, a 3D display, or an e-ink display.

The display module may form a mutual layer structure or may be integrally formed with the touch input module, thereby implementing the touch screen.

The display module may be implemented as a Head Up Display (HUD). When the display module is implemented as the HUD, the display module may include a projection module to output information through an image projected on a wind shield or a window.

The display module may include a transparent display. The transparent display may be attached to the wind shield or the window.

The transparent display may display a specific screen while having a specific transparency. In order to have transparency, the transparent display may include at least one of a transparent Thin Film Electroluminescent (TFEL), a transparent Organic Light-Emitting Diode (OLED), a transparent Liquid Crystal Display (LCD), a transmission-type transparent display, or a transparent Light Emitting Diode (LED) display. The transparency of the transparent display may be adjusted.

When implemented as the touch screen including the transparent display and the touch input module, the vehicle user interface 1300 may obtain an input signal that controls the home appliance by the touch detection of the area of the transparent display where the home appliance in the home has been displayed, and provide the obtained input signal to the vehicle controller 1200. At this time, the method in which the user inputs the input signal that controls the home appliance through the touch of the vehicle user interface 1300 may be a method of matching to the command according to the number of touch times, for example, a method that one-time touch indicates a turn-off, two-time touch indicates a turn-on, three-time touch indicates closing of a device door, and four-time touch indicates opening of the device door.

The vehicle user interface 1300 may include a plurality of display modules.

The display module may be disposed in an area of a steering wheel, an area of an instrument panel, an area of a seat, an area of each pillar, an area of a door, an area of a center console, an area of a head lining, and an area of a sun visor, or may be implemented in an area of the windshield and an area of the window.

The sound output module may convert an electrical signal provided from the vehicle controller 1200 into an audio signal to output it. For this purpose, the sound output module may include one or more speakers.

The haptic output module generates a tactile output. For example, the haptic output module may operate so that the user may recognize the output by vibrating the steering wheel, the seat belt, and the seat.

The object detector 1400 is for detecting an object positioned outside the vehicle 1000, and may generate object information based on sensing data, and transfer the generated object information to the vehicle controller 1200. At this time, the object may include various objects related to the operation of the vehicle 1000, for example, a lane, other vehicles, a pedestrian, a motorcycle, a traffic signal, a light, a road, a structure, a speed bump, a terrain, an animal, etc.

The object detector 1400 is a plurality of sensor modules, which may include camera modules 1410a, 1410b, 1410c, 1410d as a plurality of image capturers, a Light Imaging Detection and Ranging (LIDAR), an ultrasonic sensor, and a Radio Detection and Ranging (RADAR) 1450, and an infrared sensor.

The object detector 1400 may sense environment information around the vehicle 1000 through the plurality of sensor modules.

According to an embodiment, the object detector 1400 may further include other constituent elements in addition to the described constituent elements, or may not include some of the described constituent elements.

The radar may include an electromagnetic wave transmitting module and receiving module. The radar may be implemented in a Pulse radar method or a Continuous Wave radar method in terms of radio wave emission principle. The radar may be implemented by a Frequency Modulated Continuous Wave (FMCW) method or a Frequency Shift Keying (FSK) method according to a signal waveform among the Continuous Wave radar method.

The radar may detect an object based on a Time of Flight (TOF) method or a phase-shift method by using the electromagnetic wave, and detect a location of the detected object, a distance from the detected object, and a relative speed of the detected object.

The radar may be disposed at an appropriate location outside the vehicle in order to sense an object positioned at the front, back or side of the vehicle.

The lidar may include a laser transmitting module and receiving module. The lidar may be implemented in a Time of Flight (TOF) method or a phase-shift method.

The lidar may be implemented by a driving type or a non-driving type.

When implemented in the driving type, the lidar may be rotated by a motor and may detect an object around the vehicle 1000, and when implemented in the non-driving type, the lidar may detect an object positioned within a predetermined range with respect to the vehicle 1000 by the light steering. The vehicle 1000 may include a plurality of non-driving type lidars.

The lidar may detect an object based on a Time of Flight (TOF) method or a phase-shift method by using laser light, and detect a location of the detected object, a distance from the detected object, and a relative speed of the detected object.

The lidar may be disposed at an appropriate location outside the vehicle in order to sense an object positioned at the front, back or side of the vehicle.

The image capturer may be positioned at an appropriate place outside the vehicle, for example, the front, back, right side mirrors, and left side mirrors of the vehicle in order to obtain an external image of the vehicle. The image capturer may be a mono camera, but is not limited thereto, and may be a stereo camera, an Around View Monitoring (AVM) camera, or a 360 degree camera.

The image capturer may be disposed in proximity to a front windshield in the interior of the vehicle in order to obtain an image of the front of the vehicle. Alternatively, the image capturer may be disposed around a front bumper or a radiator grille.

The image capturer may be disposed to be close to the back glass in the interior of the vehicle in order to obtain an image of the back of the vehicle. Alternatively, the image capturer may be disposed around a back bumper, a trunk or a tail gate.

The image capturer may be disposed to be close to at least one of the side windows in the interior of the vehicle in order to obtain an image of the side of the vehicle. In addition, the image capturer may be disposed around a fender or a door.

The image capturer may provide the obtained image to a depth estimator 1210 of the vehicle controller 1200.

The ultrasonic sensor may include an ultrasonic transmitting module, and an ultrasonic receiving module. The ultrasonic sensor may detect an object based on ultrasonic waves, and detect the location of the detected object, the distance from the detected object, and the relative speed of the detected object.

The ultrasonic sensor may be disposed at an appropriate location outside the vehicle for sensing an object at the front, back, or side of the vehicle.

The infrared sensor may include an infrared transmitting module, and an infrared receiving module. The infrared sensor may detect an object based on infrared light, and detect the location of the detected object, the distance from the detected object, and the relative speed of the detected object.

The infrared sensor may be disposed at an appropriate location outside the vehicle for sensing an object at the front, back, or side of the vehicle.

The vehicle controller 1200 may control the overall operation of the object detector 1400.

The vehicle controller 1200 may compare data sensed by the radar, the lidar, the ultrasonic sensor, and the infrared sensor with pre-stored data so as to detect or classify an object.

The vehicle controller 1200 may detect an object and perform tracking of the object based on the obtained image. The vehicle controller 1200 may perform operations such as calculation of the distance from an object and calculation of the relative speed of the object through image processing algorithms.

For example, the vehicle controller 1200 may obtain the distance information from the object and the relative speed information of the object from the obtained image based on the change of size of the object over time.

For example, the vehicle controller 1200 may obtain the distance information from the object and the relative speed information of the object through, for example, a pin hole model and road surface profiling.

The vehicle controller 1200 may detect an object and perform tracking of the object based on the reflected electromagnetic wave reflected back from the object. The vehicle controller 1200 may perform operations such as calculation of the distance to the object and calculation of the relative speed of the object based on the electromagnetic waves.

The vehicle controller 1200 may detect an object, and perform tracking of the object based on the reflected laser light reflected back from the object. Based on the laser light, the vehicle controller 1200 may perform operations such as calculation of the distance to the object and calculation of the relative speed of the object based on the laser light.

The vehicle controller 1200 may detect an object and perform tracking of the object based on the reflected ultrasonic wave reflected back from the object. The vehicle controller 1200 may perform operations such as calculation of the distance to the object and calculation of the relative speed of the object based on the reflected ultrasonic wave.

The vehicle controller 1200 may detect an object and perform tracking of the object based on the reflected infrared light reflected back from the object. The vehicle controller 1200 may perform operations such as calculation of the distance to the object and calculation of the relative speed of the object based on the infrared light.

Depending on the embodiment, the object detector 1400 may include a separate processor from the vehicle processor 1200. In addition, the radar, the lidar, the ultrasonic sensor, and the infrared sensor may each include a processor.

When the processor is included in the object detector 1400, the object detector 1400 may be operated under the control of the processor controlled by the vehicle controller 1200.

The driving operator 1500 may receive a user input for driving. In the manual mode, the vehicle 1000 may be operated based on a signal provided by the driving operator 1500.

The vehicle driver 1600 may electrically control driving of various devices in the vehicle 1000. The vehicle driver 1600 may electrically control driving of a power train, a chassis, a door/a window, a safety device, a lamp, and an air conditioner in the vehicle 1000.

The operator 1700 may control various operations of the vehicle 1000. The operator 1700 may operate in the autonomous driving mode.

The operator 1700 may include a driving module, an unparking module, and a parking module.

Depending on the embodiment, the operator 1700 may further include constituent elements other than the constituent elements to be described, or may not include some of the constitute elements.

The operator 1700 may include a processor under the control of the vehicle controller 1200. Each module of the operator 1700 may include a processor individually.

Depending on the embodiment, when the operator 1700 is implemented as software, it may be a sub-concept of the vehicle controller 1200.

The driving module may perform driving of the vehicle 1000.

The driving module may receive object information from the object detector 14000, and provide a control signal to a vehicle driving module to perform the driving of the vehicle 1000.

The driving module may receive a signal from an external device through the vehicle communicator 1100, and provide a control signal to the vehicle driving module, so that the unparking of the vehicle 1000 may be performed.

In the unparking module, unparking of the vehicle 1000 may be performed.

In the unparking module, navigation information may be provided from the navigation module, and a control signal may be provided to the vehicle driving module, so that the unparking of the vehicle 1000 may be performed.

In the unparking module, object information may be received from the object detector 1400, and a control signal may be provided to the vehicle driving module, so that the parking of the vehicle 1000 may be performed.

In the unparking module, a signal may be provided from an external device through the vehicle communicator 1100, and a control signal may be provided to the vehicle driving module, so that the parking of the vehicle 1000 may be performed.

In the parking module, parking of the vehicle 1000 may be performed.

In the parking module, navigation information may be provided from the navigation module, and a control signal may be provided to the vehicle driving module, so that the parking of the vehicle 1000 may be performed.

In the parking module, object information may be provided from the object detector 1400, and a control signal may be provided to the vehicle driving module, so that the parking of the vehicle 1000 may be performed.

In the parking module, a signal may be provided from the external device through the vehicle communicator 1100, and a control signal may be provided to the vehicle driving module so that the parking of the vehicle 1000 may be performed.

The navigation module may provide navigation information to the vehicle controller 1200. The navigation information may include at least one of map information, set destination information, route information according to destination setting, information on various objects on the route, lane information, or present location information of the vehicle.

The navigation module may provide the vehicle controller 1200 with a parking lot map of the parking lot in which the vehicle 1000 has entered. The vehicle controller 1200, when the vehicle 1000 enters a parking lot, may be provided with a map of the parking lot from the navigation module, and may reflect a calculated movement route and fixed identification information to the parking lot map so as to generate map data.

The navigation module may include a memory. The memory may store navigation information. The navigation information may be updated by information received through the vehicle communicator 1100. The navigation 1800 may be controlled by an internal processor, or may operate by receiving an external signal, for example, a control signal from the vehicle controller 1200, but the present disclosure is not limited thereto.

The driving module of the operator 1700 may be provided with the navigation information from the navigation module, and may provide a control signal to the vehicle driving module so that driving of the vehicle 1000 may be performed.

The sensor 1800 may sense the state of the vehicle 1000 using a sensor mounted on the vehicle 1000, that is, a signal related to the state of the vehicle 1000, and obtain movement route information of the vehicle 1000 according to the sensed signal. The sensor 1800 may provide the obtained movement route information to the vehicle controller 1200.

The sensor 1800 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a location module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal location sensor, and a brake pedal location sensor, but is not limited thereto.

The sensor 1800 may obtain sensing signals for information such as vehicle posture information, vehicle collision information, vehicle direction information, vehicle location information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 1800 may further include an acceleration pedal sensor, a pressure sensor, an engine speed sensor, an air flow sensor (AFS), an air temperature sensor (ATS), a water temperature sensor (WTS), a throttle location sensor (TPS), a TDC sensor, a crank angle sensor (CAS), but is not limited thereto.

The sensor 1800 may generate vehicle status information based on sensing data. The vehicle status information may be information generated based on data sensed by various sensors included in the inside of the vehicle.

The vehicle status information may include at least one of posture information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, vehicle interior temperature information, vehicle interior humidity information, pedal location information, or vehicle engine temperature information.

The vehicle storage 1900 may be electrically connected to the vehicle controller 1200. The vehicle storage 1900 may store basic data for each unit of a virtual home service apparatus, control data for operation control of each unit of the virtual home service apparatus, and input/output data. The vehicle storage 1900 may be various storage devices such as a ROM, a RAM, an EPROM, a flash drive, and a hard drive, in terms of hardware. The vehicle storage 1900 may store various data for operating the entire vehicle 1000 such as a program for processing or controlling the vehicle controller 1200, particularly, driver tendency information. At this time, the vehicle storage 1900 may be integrally formed with the vehicle controller 1200 or implemented by a lower constituent element of the vehicle controller 1200.

Figure 3:
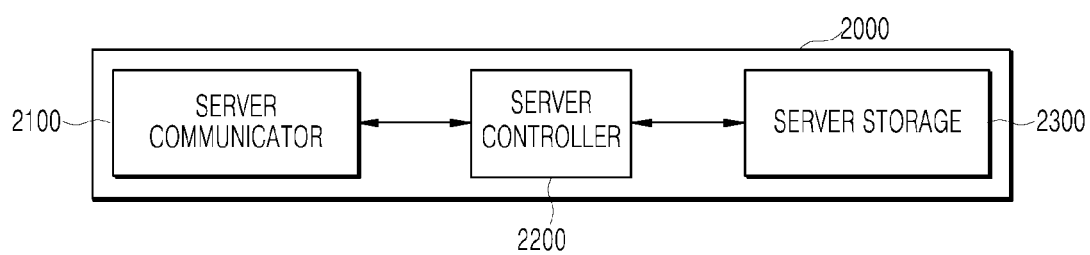
FIG. 3 is a block diagram illustrating a virtual home service apparatus installed at a server side according to an embodiment of the present disclosure.

FIG. 3 is a block diagram illustrating a virtual home service apparatus installed at a server side according to an embodiment of the present disclosure.

Referring to FIG. 3, the virtual home service apparatus may include a server communicator 2100, a server controller 2200, and a server storage 2300.

According to an embodiment, the server 2000 to which the virtual home service apparatus is applied may include other constituent elements in addition to the constituent elements illustrated in FIG. 3 and described below, or may not include some of the constituent elements illustrated in FIG. 3 and described below. On the other hand, although illustrated in FIG. 3 by assuming that the virtual home service apparatus has been mounted on the server 2000, the same apparatus may be applied to the vehicle 1000.

The server communicator 2100 may transmit the virtual home information, the design drawing provided by the server 3000, and the internal image and the SLAM information obtained from the robot cleaner 4000 based on the downlink grant of the 5G network for the vehicle 1000.

The server communicator 2100 may receive information including the design drawing of the user home from a real estate brokerage server or a real estate construction company server among the external servers 3000.

The server controller 2200 may include a home information collection module, a home appliance identification module, and a virtual home implementation module.

The home information collection module of the server controller 2200 may obtain the design drawing of the home provided by the external server 3000 through the server communicator 2100 based on the user identification information of the home appliance, and obtain the 3D drawing by converting the design drawing.

The home information collection module of the server controller 2200 may convert a two-dimensional design drawing into a 3D drawing according to a line processing method, a surface processing method, and a sphere processing method.

At this time, the line processing method is represented by a line segment connecting the points, the surface processing method is represented by a surface by connecting the line segments, and the sphere processing method is represented by a sphere by connecting the surfaces.

At this time, the sphere processing method includes a Constructive Solid Geometry (CGS), a Boundary Representation (B-Rep), and a Cell Decomposition method. The Constructive Solid Geometry (CGS) creates a sphere by using sets (sum, common, subset) concept while designating a location by using predetermined primitives (hexahedron, cone, cylinder, sphere, etc.). The Boundary Representation forms a sphere by using a line and a surface. In addition, the Cell Decomposition method is represented by their sets by successively decomposing a complex structure into parts having different characteristics from each other (e.g., regular hexagon, triangular pillar, block, etc.).

The home information collection module of the server controller 2200 may generate a design drawing request signal for requesting the design drawing of the user home by using an address registered at the time of sale of the home appliance as user identification information, and transmit the generated design drawing request signal to a real estate brokerage server among the external servers 3000 through the server communicator 2100. In particular, when the user home is an apartment, the home information collection module of the server controller 2200 may receive the design drawing of the floor space corresponding to the apartment name, the building number and the room number, in which the user resides, from the real estate brokerage server by using the address information.

The home information collection module of the server controller 2200 may generate a design drawing request signal for requesting the design drawing of the user home by using an address registered at the time of sale of the home appliance as user identification information, and transmit the generated design drawing request signal to a real estate construction company server among the external servers 3000 through the server communicator 2100. In particular, when the user home is a house sold by a large construction company, the home information collection module of the server controller 2200 may receive the design drawing corresponding to the house sold to the user from the real estate construction company server by using the address information.

The home appliance identification module of the server controller 2200 may obtain the internal image and the SLAM information in the home through the server communicator 2100, and identify the location and state of the home appliance based on the internal image and the SLAM information.

At this time, the home appliance identification module of the server controller 2200 may supplement the 3D drawing generated by the home information collection module by using the SLAM information.

The home appliance identification module of the server controller 2200 may determine unique characteristics of the additional home appliance according to the acquisition of the additional home appliance information input by the passenger of the vehicle 1000 through the server communicator 2100, define an area where the robot cleaner 4000 will obtain the updated internal image and the updated SLAM information in the home based on the unique characteristics, obtain the updated internal image and the updated SLAM information through the server communicator 2100, and identify the location and state of the additional home appliance based on the obtained updated internal image and updated SLAM information.

For example, if the additional home appliance input by the passenger of the vehicle 1000 is the washing machine the home appliance identification module of the server controller 2200 may use the internal image and the SLAM information, which have been obtained by driving the robot cleaner 4000 only in a place where the washing machine is likely to be disposed according to the unique characteristics of the washing machine, for example, in a utility room, for identifying the location and state of the washing machine. On the other hand, the home appliance identification module of the server controller 2200 may use the internal image and the SLAM information, which have been obtained by driving the robot cleaner 4000 only in the other space than a place where the washing machine is less likely to be disposed, for example, the bedroom in the above case, for identifying the location and state of the washing machine.

The home appliance identification module of the server controller 2200 may define an area where the robot cleaner 4000 will obtain the updated internal image and the updated SLAM information in the home based on an area designation signal input by the passenger of the vehicle 1000 and provided through the server communicator 2100, obtain the updated internal image and the updated SLAM information through the server communicator 2100, and identify the location and state of the additional home appliance based on the obtained updated internal image and updated SLAM information.

In the home appliance identification module of the server controller 2200, when the passenger of the vehicle 1000 designates a space that needs to be updated, for example, two bedrooms and a living room, the robot cleaner 4000 may obtain the internal image and the SLAM information only for the designated space according to the control signal generated by the server controller 2200, thereby saving the time required for the operation of the robot cleaner 4000, and accordingly, it is possible to identify the location and state of the additional home appliance within a fast time compared with obtaining the internal image and SLAM information for the entire home.

The virtual home implementation module of the server controller 2200 may generate virtual home information by reflecting the location and state of the home appliance to the 3D drawing generated by the home information collection module. Here, the server controller 2200 may provide the generated virtual home information as information for supporting the virtual home interface that operates in the vehicle 1000 through the server communicator 2100.

The virtual home implementation module of the server controller 2200 may update the virtual home information by reflecting the location and state of the additional home appliance, which have been identified based on the area designated by the user in the home appliance identification module or the unique characteristics of the additional home appliance, to the 3D drawing.

When receiving an input signal by the voice recognition spoken by the passenger of the vehicle 1000, particularly, an input signal that controls the home appliance disposed in the home, for example, a voice command such as "Turn off the TV." or "Close the refrigerator." through the server commu-nicator 2100, the server controller 2200 may generate a signal that controls the device responding to a voice command, for example, a TV or the robot cleaner 4000 that will perform a closing operation of a refrigerator, and transmit the generated control signal through the server communicator 2100.

When receiving a signal input by the method in which the passenger of the vehicle 1000 touches an area of the transparent display where the home appliance in the home has been displayed through the server communicator 2100, the server controller 2200 may generate a signal that controls the device responding to the input signal, and transmit the generated control signal through the server communicator 2100.

The server storage 2300 may store the design drawing, the home internal image, and the SLAM information input through the server communicator 2100.

The server storage 2300 may be various storage devices such as a ROM, a RAM, an EPROM, a flash drive, a hard drive, or the like in hardware. The server storage 2300 may store various data for an operation of the entire server 2000 such as a program for processing or controlling the server controller 2200, particularly, user tendency information. At this time, the server storage 2300 may be integrally formed with the server controller 2200, or implemented as a lower constituent element of the server controller 2200.

Figure 4:
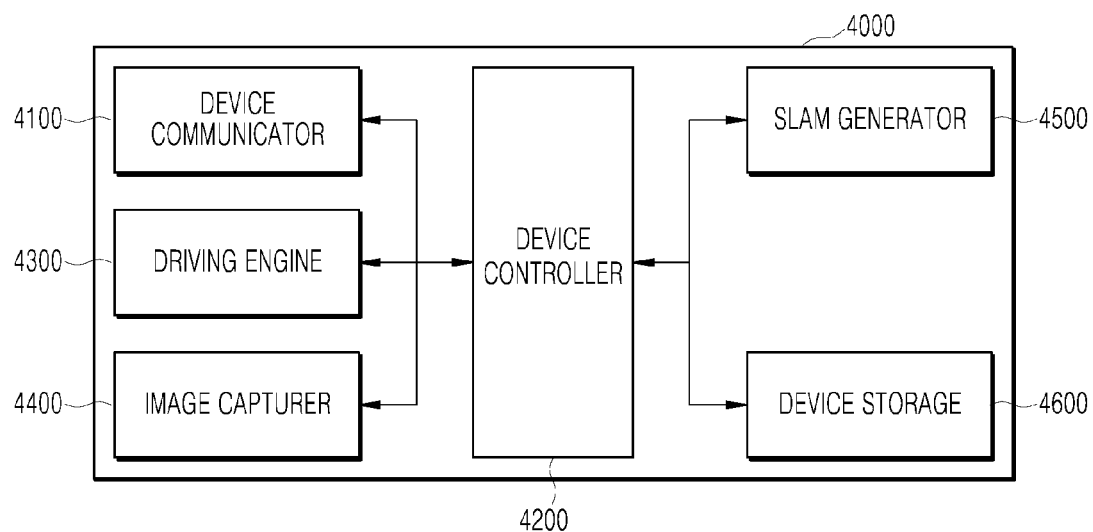
FIG. 4 is a block diagram illustrating a virtual home service apparatus installed at a robot cleaner side according to an embodiment of the present disclosure.

FIG. 4 is a block diagram illustrating a virtual home service apparatus installed at a robot cleaner side according to an embodiment of the present disclosure.

Referring to FIG. 4, the virtual home service apparatus may include a device communicator 4100, a device controller 4200, a driving engine 4300, an image capturer 4400, a SLAM generator 4500, and a device storage 4600.

According to an embodiment, the robot cleaner 4000 to which the virtual home service apparatus is applied may include other constituent elements in addition to the constituent elements illustrated in FIG. 4 and described below, or may not include some of the constituent elements illustrated in FIG. 4 and described below.

The device communicator 4100 is a module for communicating with an external apparatus. Here, the external apparatus may be the vehicle 1000 or the server 2000.

The device communicator 4100 may transmit the internal image and the SLAM information obtained by the image capturer 4400 and the SLAM generator 4500 to the vehicle 1000 or the server 2000, particularly, the server connected with the vehicle 1000 based on the downlink grant of the 5G network.

When receiving a control signal for obtaining the internal image and the SLAM information through the device communicator 4100, the device controller 4200 may activate the SLAM information stored in the device storage 4600, perform in-home cleaning by controlling the driving engine 4300, obtain the home internal image by controlling the image capturer 4400, and update the SLAM information as the in-home cleaning has been completed.

The device controller 4200 may transmit the internal image and the SLAM information to the vehicle 1000 or the server 2000 through the device communicator 4100. Here, the SLAM information may be information corresponding to the map created by the SLAM generator 4500.

The device controller 4200 may perform cleaning only on the area defined by the home appliance identification module of the vehicle controller 1200 or the server controller 2200, and provide the updated internal image and the updated SLAM information generated as the cleaning in the defined area has been completed to the vehicle 1000 or the server 2000 through the device communicator 4100.

The driving engine 4300 may move the robot cleaner 4000 in a predetermined path under the control of the device controller 4200. Here, the predetermined path may be a path for controlling the home appliance in the home, for example, a path for performing an operation of closing the refrigerator door.

The image capturer 4400 may obtain a home internal image under the control of the device controller 4200, and provide the obtained image to the device controller 4200.

The SLAM generator 4500 may recognize the location and posture of the robot cleaner 4000 in the home through the SLAM technology, create a map according to the recognized location, and provide the created map to the device controller 4200.

The device storage 4600 may store the SLAM information, and provide the SLAM information stored under the control of the device controller 4200 to the device controller 4200.

The device storage 4600 may be various storage devices such as a ROM, a RAM, an EPROM, a flash drive, and a hard drive in hardware. The device storage 4600 may store various data for an overall operation of the robot cleaner 4000 such as a program for processing or controlling the device controller 4200, particularly, user tendency information. At this time, the device storage 4600 may be integrally formed with the device controller 4200 or implemented as a lower constituent element of the device controller 4200.

Figure 11:
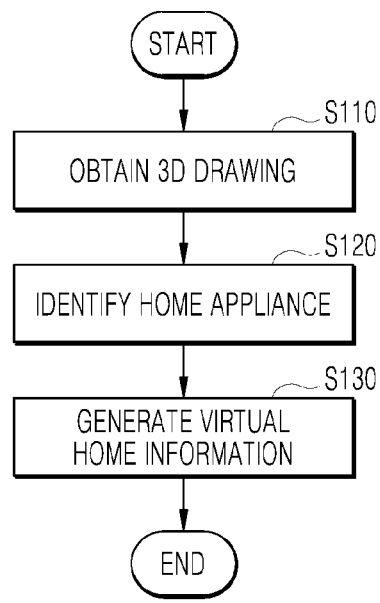
FIGS. 11 and 12 are flowcharts illustrating an operation of a virtual home service method according to an embodiment of the present disclosure.
Figure 12:
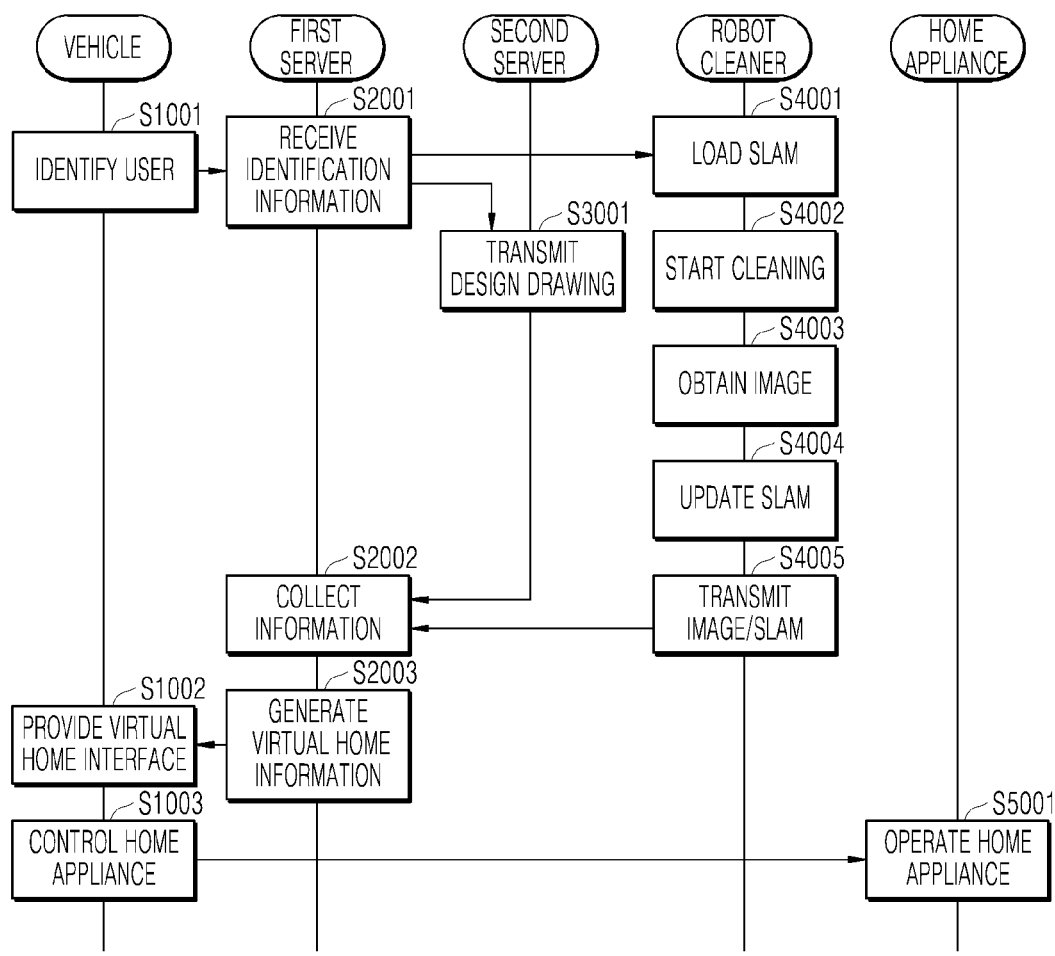

FIGS. 11 and 12 are flowcharts illustrating an operation of a virtual home service method according to an embodiment of the present disclosure.

Figure 13:
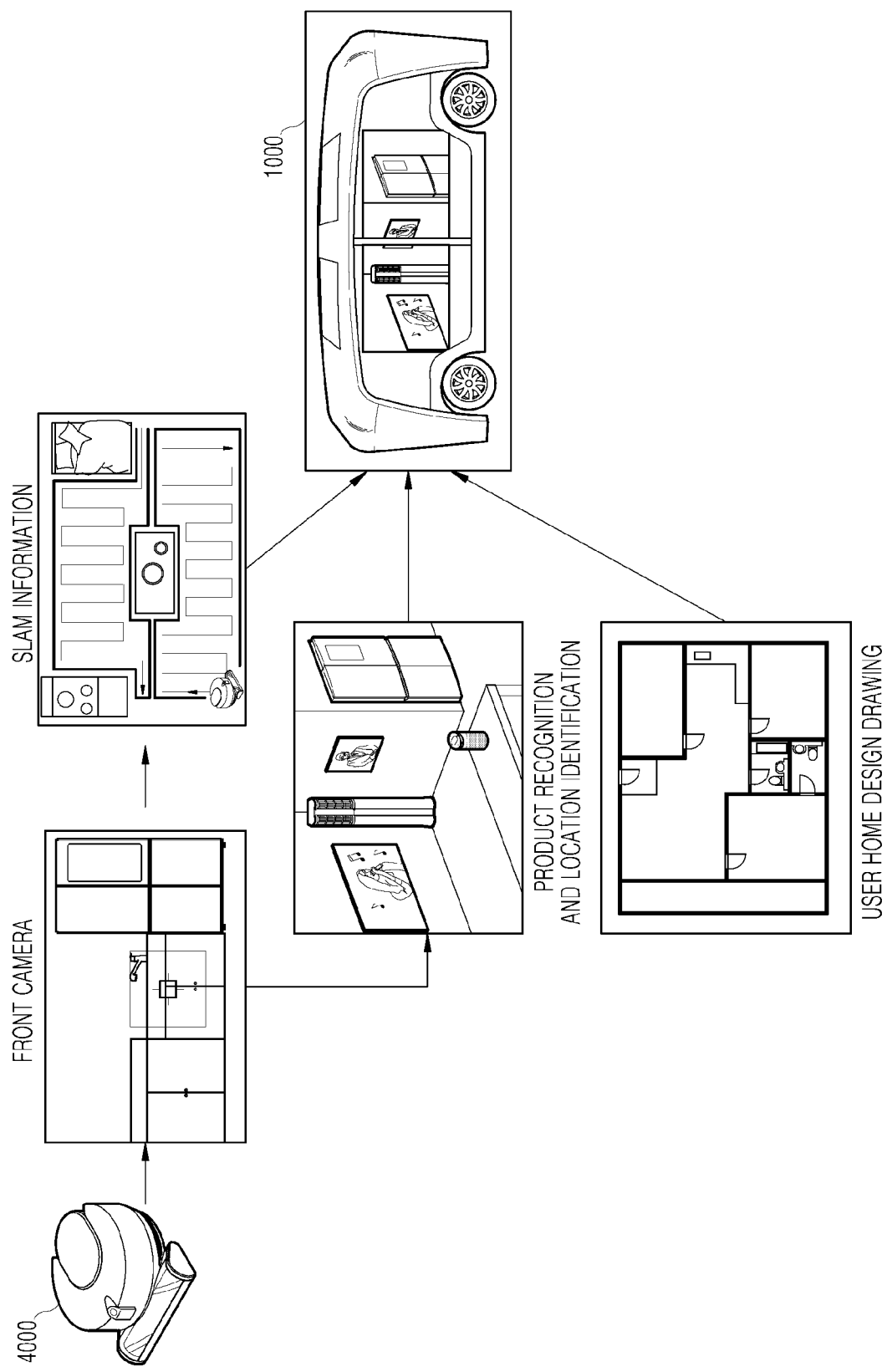
FIG. 13 is a diagram for explaining an operation of the virtual home service apparatus installed at the vehicle side according to an embodiment of the present disclosure.

FIG. 13 is a diagram illustrating an operation of a virtual home service apparatus installed at a vehicle side according to an embodiment of the present disclosure.

A virtual home service method may include other steps in addition to the steps illustrated in FIGS. 11 to 13 and described below, or may not include some of the steps illustrated in FIGS. 11 to 13 and described below.

The vehicle 1000 or the server 2000 may obtain the design drawing of the home from the external server 3000 such as a real estate brokerage server or a real estate construction company server based on the user identification information of the home appliance, and obtain a 3D drawing by converting the design drawing (operation S110).

The vehicle 1000 or the server 2000 may obtain the internal image and the SLAM information of the home from the robot cleaner 4000, and identify the location and state of the home appliance based on the internal image and the SLAM information (operation S120). At this time, the vehicle 1000 or the server 2000 may reflect the SLAM information obtained from the robot cleaner 4000 at the time of converting the design drawing in order to improve the precision of the 3D drawing.

The vehicle 1000 or the server 2000 may generate the virtual home information or the database by reflecting the location and state of the home appliance to the 3D drawing, that is, disposing the home appliance identified in the 3D drawing (operation S130). The virtual home information or the database generated by the vehicle 1000 or the server 2000 may be provided as data for supporting the virtual home interface provided by the vehicle 1000.

As illustrated in FIG. 12, the home information collection module of the vehicle controller 1200 may identify a user by using an address registered at the time of sale of the home appliance (operation S1001).

The server controller 2200 of a first server may generate a design drawing request signal for requesting the design drawing of the user home by using the user identification information provided from the vehicle 1000 and also generate a control signal that controls the robot cleaner 4000 (operation S2001).

The second server 3000, which is a real estate brokerage server or a real estate construction company server, may transmit the corresponding design drawing to the first server 2000 after receiving the design drawing request signal of the first server 2000 (operation S3001).

When receiving a control signal for obtaining the internal image and the SLAM information through the device communicator 4100, the device controller 4200 of the robot cleaner 4000 may activate the SLAM information stored in the device storage 4600 (operation S4001), perform the in-home cleaning by controlling the driving engine 4300 (operation S4002), obtain the home internal image by controlling the image capturer 4400 (operation S4003), and update the SLAM information as the in-home cleaning has been completed (operation S4004). The robot cleaner 4000 may transmit the corresponding internal image and SLAM information to the first server 2000 (operation S4005).

The first server 2000 may collect the design drawing, the internal image, the SLAM information, etc. from the second server 3000 and the robot cleaner 4000 (operation S2002), and implement the virtual home information or the database by using the collected information (operation S2003). For example, the first server 2000 may generate a 3D home structure by using the design drawing and the SLAM information, identify the state of the home appliance by recognizing the internal image, and construct the virtual home database by disposing the identified home appliance in the generated home structure.

The virtual home information implemented in the first server 2000 may be transmitted to the vehicle 1000 to be used as data for supporting the virtual home interface (operation S1002).

The passenger of the vehicle 1000 may input a signal that controls the home appliance through the virtual home interface (operation S1003), and the home appliance in the home may operate by a signal input by the passenger of the vehicle 1000 (operation S5001).

As illustrated in FIG. 13, an image including the home appliance may be obtained through the image capturer 4400 of the robot cleaner 4000, for example, a front camera, and the SLAM information may be obtained as the robot cleaner 4000 performs a cleaning operation.

The image including the home appliance may be provided to the vehicle 1000 or the server 2000, and the location of the home appliance may be recognized by the vehicle controller 1200 or the server controller 2200.

In addition, the real estate brokerage server or the real estate construction company server that is the external server 3000 may provide the design drawing of the user home to the vehicle 1000 or the server 2000.

The vehicle 2000 may receive the virtual home information generated by the information collected through the external server 3000 and the robot cleaner 4000, and provide the virtual home interface including the image of what can be experienced in the home through the transparent display attached to the window by using the received virtual home information.

The present disclosure described above may be implemented as a computer-readable code in a medium on which a program is recorded. The computer readable medium includes all types of recording devices in which data readable by a computer system readable may be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like, and it may also be implemented in the form of a carrier wave (for example, transmission over the Internet). In addition, the computer may include a processor or a controller. Therefore, the above description should not be construed as limiting and should be considered illustrative. The scope of the present disclosure should be determined by rational interpretation of the appended claims, and all changes within the scope of equivalents of the present disclosure are included in the scope of the present disclosure.

What is claimed is:

1. A virtual home service apparatus for providing data for supporting a virtual home interface to a vehicle for providing the virtual home interface for controlling an operation of a home appliance installed in a home, comprising:
    a communicator;
    a home information collector for obtaining a design drawing of the home through the communicator based on user identification information of the home appliance, and obtaining a 3D drawing by converting the design drawing;
    a home appliance identifier for obtaining an internal image and simultaneous localization and mapping (SLAM) information of the home through the communicator, and identifying a location and a state of the home appliance based on the internal image and the SLAM information; and
    a virtual home implementator for generating virtual home information by reflecting the location and state of the home appliance to the 3D drawing,
    wherein the virtual home information is provided to the vehicle as the data for supporting the virtual home interface,
    wherein the virtual home service apparatus further comprises a user interface for providing the virtual home interface,
    wherein the user interface comprises a transparent display attached to a vehicle window,
    wherein the user interface provides an interface for receiving an area designation signal that designates an area where a robot cleaner disposed in the home obtains an updated internal image and updated SLAM information in the home,
    wherein the home appliance identifier defines an area where the robot cleaner obtains the updated internal image and the updated SLAM information in the home based on the area designation signal input through the user interface, obtains the updated internal image and the updated SLAM information through the communicator, and identifies a location and a state of an additional home appliance based on the obtained updated internal image and updated SLAM information,
    wherein the robot cleaner provides the updated internal image and the updated SLAM information only for the area defined by the home appliance identifier to the communicator, and
    wherein the virtual home implementator updates the virtual home information by reflecting the location and the state of the additional home appliance to the 3D drawing.

2. The virtual home service apparatus of claim 1,
    wherein the home information collector generates a design drawing request signal that requests the design drawing by using an address registered at the time of sale of the home appliance as the user identification information, and transmits the generated design drawing request signal to a real estate brokerage server through the communicator, and
    wherein the communicator receives information comprising the design drawing from the real estate brokerage server.

3. The virtual home service apparatus of claim 1,
    wherein the home information collector generates a design drawing request signal that requests the design drawing by using an address registered at the time of sale of the home appliance as the user identification information, and transmits the generated design drawing request signal to a real estate construction company server through the communicator, and
    wherein the communicator receives information comprising the design drawing from the real estate construction company server.

4. The virtual home service apparatus of claim 1,
    wherein the communicator receives the internal image and the SLAM information based on a downlink grant of a 5G network connected for operating the vehicle, and
    wherein the internal image and the SLAM information are provided from the robot cleaner disposed in the home connected to the 5G network.

5. The virtual home service apparatus of claim 1,
    wherein the user interface obtains an input signal that controls the home appliance by voice recognition.

6. The virtual home service apparatus of claim 1,
    wherein the user interface obtains an input signal that controls the home appliance by touch detection of an area of the transparent display where the home appliance has been displayed.

7. The virtual home service apparatus of claim 1,
    wherein the user interface provides an interface for receiving additional home appliance information for the additional home appliance in the home,
    wherein the home appliance identifier determines unique characteristics of the additional home appliance according to the acquisition of the additional home appliance information through the user interface, defines an area where the robot cleaner obtains an updated internal image and updated SLAM information in the home based on the unique characteristics, obtains the updated internal image and the updated SLAM information through the communicator, and identifies the location and the state of the additional home appliance based on the obtained updated internal image and updated SLAM information,
    wherein the robot cleaner provides the updated internal image and the updated SLAM information only for the area defined by the home appliance identifier to the communicator, and
    wherein the virtual home implementator updates the virtual home information by reflecting the location and the state of the additional home appliance to the 3D drawing.

8. A virtual home service method for providing data for supporting a virtual home interface to a vehicle for providing the virtual home interface for controlling an operation of a home appliance installed in a home, comprising:

a first operation that obtains a design drawing of the home based on user identification information of the home appliance, and obtains a 3D drawing by converting the design drawing;

a second operation that obtains an internal image and simultaneous localization and mapping/SLAM) information in the home, and identifies a location and a state of the home appliance based on the internal image and the SLAM information; and a third operation that generates virtual home information by reflecting the location and state of the home appliance to the 3D drawing, wherein the virtual home information is provided to the vehicle as the data for supporting the virtual home interface, wherein the virtual home service method further comprises a fourth operation that provides the virtual home interface, wherein the virtual home interface is provided through a transparent display attached to a vehicle window, wherein the virtual home service method further comprises:

providing an interface for receiving an area designation signal that designates an area where a robot cleaner disposed in the home obtains an updated internal image and updated SLAM information in the home, defining an area where the robot cleaner obtains the updated internal image and the updated SLAM information in the home based on the area designation signal input through the virtual home interface, receiving the updated internal image and the updated SLAM information only for the defined area from the robot cleaner, identifying a location and a state of an additional home appliance based on the updated internal image and the updated SLAM information, and updating the virtual home information by reflecting the location and the state of the additional home appliance to the 3D drawing.

9. The virtual home service method of claim 8, wherein the first operation comprises generating a design drawing request signal that requests the design drawing by using an address registered at the time of sale of the home appliance as the user identification information, and transmitting the generated design drawing request signal to a real estate brokerage server; and receiving information comprising the design drawing from the real estate brokerage server.

10. The virtual home service method of claim 8, wherein the first operation comprises generating a design drawing request signal that requests the design drawing by using an address registered at the time of sale of the home appliance as the user identification information, and transmitting the generated design drawing request signal to a real estate construction company server; and receiving information comprising the design drawing from the real estate construction company server.

11. The virtual home service method of claim 8, wherein the second operation comprises receiving the internal image and the SLAM information based on a downlink grant of a 5G network connected for operating the vehicle, and wherein the internal image and the SLAM information are provided from the robot cleaner disposed in the home connected to the 5G network.

12. The virtual home service method of claim 8, wherein the virtual home interface is a voice recognition interface for obtaining an input signal that controls the home appliance by voice recognition.

13. The virtual home service method of claim 8, wherein the virtual home interface is a touch input interface for obtaining an input signal that controls the home appliance by touch detection of an area of the transparent display where the home appliance has been displayed.

14. The virtual home service method of claim 8, further comprising:

a fifth operation that provides an interface for receiving additional home appliance information for the additional home appliance in the home;

a sixth operation that determines unique characteristics of the additional home appliance according to the acquisition of the additional home appliance information, and defines an area where the robot cleaner obtains an updated internal image and updated SLAM information in the home based on the unique characteristics;

a seventh operation that receives the updated internal image and the updated SLAM information only for an area defined by the sixth operation from the robot cleaner;

an eighth operation that identifies the location and the state of the additional home appliance based on the updated internal image and the updated SLAM information provided from the seventh operation; and a ninth operation that updates the virtual home information by reflecting the location and the state of the additional home appliance to the 3D drawing.

15. A computer readable recording medium recording a virtual home service program using a robot cleaner for providing data for supporting a virtual home interface to a vehicle for providing the virtual home interface for controlling an operation of a home appliance installed in a home, comprising:

obtaining a design drawing of the home based on user identification information of the home appliance, and obtaining a 3D drawing by converting the design drawing;

obtaining an internal image and simultaneous localization and mapping (SLAM) information in the home, and identifying a location and a state of the home appliance based on the internal image and the SLAM information; and generating virtual home information by reflecting the location and the state of the home appliance to the 3D drawing, wherein the virtual home information is provided to the vehicle as the data for supporting the virtual home interface, wherein the computer readable recording medium further comprises providing the virtual home interface, wherein the virtual home interface is provided through a transparent display attached to a vehicle window, wherein the computer readable recording medium further comprises:

providing an interface for receiving an area designation signal that designates an area where a robot cleaner disposed in the home obtains an updated internal image and updated SLAM information in the home;

defining an area where the robot cleaner obtains the updated internal image and the updated SLAM information in the home based on the area designation signal input through the virtual home interface;

receiving the updated internal image and the updated SLAM information only for the defined area from the robot cleaner;
identifying a location and a state of an additional home appliance based on the updated internal image and the updated SLAM information; and
updating the virtual home information by reflecting the location and the state of the additional home appliance to the 3D drawing.

* * * * *